United States Patent
Kim et al.

(10) Patent No.: US 9,207,854 B2
(45) Date of Patent: Dec. 8, 2015

(54) MOBILE TERMINAL AND USER INTERFACE OF MOBILE TERMINAL

(71) Applicant: LG Electronics Inc., Seoul (KR)

(72) Inventors: Jeong-Tae Kim, Ulwang (KR); Hye-Bong Lim, Anyang (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 13/925,382

(22) Filed: Jun. 24, 2013

(65) Prior Publication Data

US 2013/0278533 A1   Oct. 24, 2013

Related U.S. Application Data

(63) Continuation of application No. 13/562,930, filed on Jul. 31, 2012, now Pat. No. 8,497,882, which is a continuation of application No. 12/421,276, filed on Apr. 9, 2009, now Pat. No. 8,259,136.

(30) Foreign Application Priority Data

Oct. 6, 2008   (KR) .................. 10-2008-0097748

(51) Int. Cl.
*G09G 5/00* (2006.01)
*G06F 3/0488* (2013.01)
*H04M 1/725* (2006.01)

(52) U.S. Cl.
CPC ......... *G06F 3/0488* (2013.01); *H04M 1/72594* (2013.01); *G06F 2203/04805* (2013.01)

(58) Field of Classification Search
None
See application file for complete search history.

(56) References Cited

U.S. PATENT DOCUMENTS

| | | | | |
|---|---|---|---|---|
| 4,384,336 A * | 5/1983 | Frankle et al. | | 382/302 |
| 5,828,376 A | 10/1998 | Solimene et al. | | |
| 5,854,629 A * | 12/1998 | Redpath | | 715/830 |
| 5,900,872 A * | 5/1999 | Ashe | | 715/786 |
| 5,933,137 A * | 8/1999 | Anderson | | 715/720 |
| 6,014,140 A * | 1/2000 | Strand | | 345/684 |
| 6,704,034 B1 | 3/2004 | Rodriguez et al. | | |
| 7,075,512 B1 | 7/2006 | Fabre et al. | | |
| 7,196,689 B2 * | 3/2007 | Moriyama | | 345/156 |
| 7,248,269 B2 | 7/2007 | Card et al. | | |
| 7,461,077 B1 * | 12/2008 | Greenwood | | 1/1 |
| 7,469,381 B2 * | 12/2008 | Ording | | 715/702 |
| 7,502,450 B2 * | 3/2009 | Sakai et al. | | 379/93.35 |
| 7,895,531 B2 | 2/2011 | Radtke et al. | | |
| 8,028,251 B2 * | 9/2011 | Park et al. | | 715/863 |
| 8,245,142 B2 * | 8/2012 | Mizrachi et al. | | 715/744 |
| 2003/0006995 A1 | 1/2003 | Smith et al. | | |
| 2003/0214519 A1 | 11/2003 | Smith et al. | | |
| 2004/0092284 A1 | 5/2004 | Satoh et al. | | |

(Continued)

FOREIGN PATENT DOCUMENTS

EP   0 651 543 A2   5/1995
EP   0 661 622 A2   7/1995

(Continued)

*Primary Examiner* — Ryan R Yang
(74) *Attorney, Agent, or Firm* — Birch, Stewart, Kolasch & Birch, LLP

(57) ABSTRACT

A mobile terminal including a display, and a controller coupled to the display, the controller configured to display information on the display, scroll the displayed information in response to a touch and moving input applied on the display in a direction, and refresh the displayed information if the touch and moving input is released subsequent to the scrolling of the displayed information.

20 Claims, 18 Drawing Sheets

(56) References Cited

U.S. PATENT DOCUMENTS

| | | |
|---|---|---|
| 2004/0196310 A1 | 10/2004 | Aamodt et al. |
| 2004/0239686 A1 | 12/2004 | Koyama et al. |
| 2004/0242266 A1 | 12/2004 | Tagliabue et al. |
| 2007/0070039 A1 | 3/2007 | Lee |
| 2007/0198950 A1 | 8/2007 | Dodge et al. |
| 2008/0016447 A1* | 1/2008 | Iwata et al. .................. 715/734 |
| 2008/0062207 A1* | 3/2008 | Park .............................. 345/684 |
| 2008/0134079 A1* | 6/2008 | Brunner et al. ............... 715/784 |
| 2008/0168349 A1 | 7/2008 | Lamiraux et al. |
| 2009/0295713 A1* | 12/2009 | Piot et al. ...................... 345/156 |

FOREIGN PATENT DOCUMENTS

| | | |
|---|---|---|
| EP | 2 348 697 A2 | 7/2011 |
| KR | 10-0689525 B1 | 3/2007 |
| WO | WO 2006/030069 A1 | 3/2006 |
| WO | WO 2008/029180 A1 | 3/2008 |

\* cited by examiner

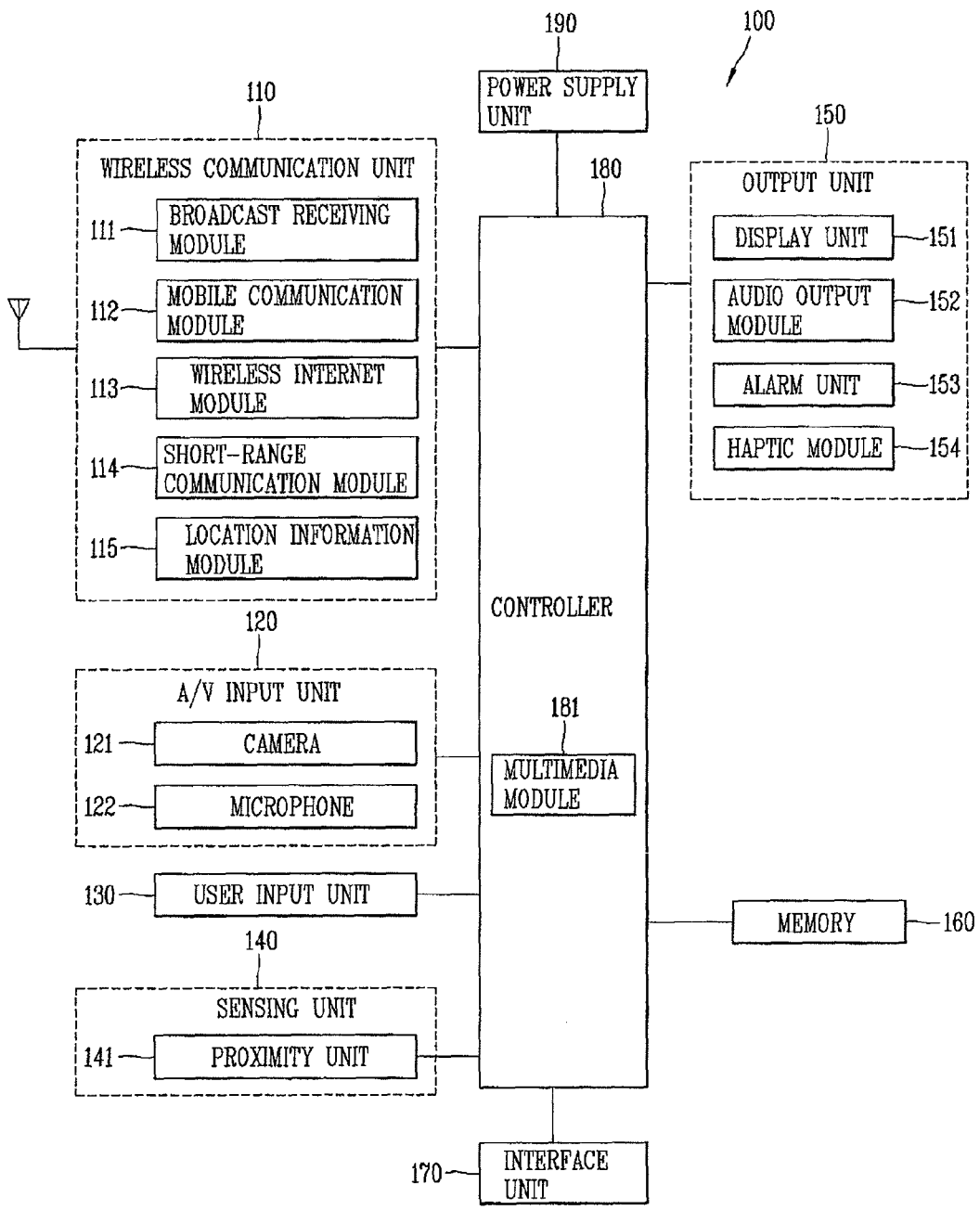

FIG. 6
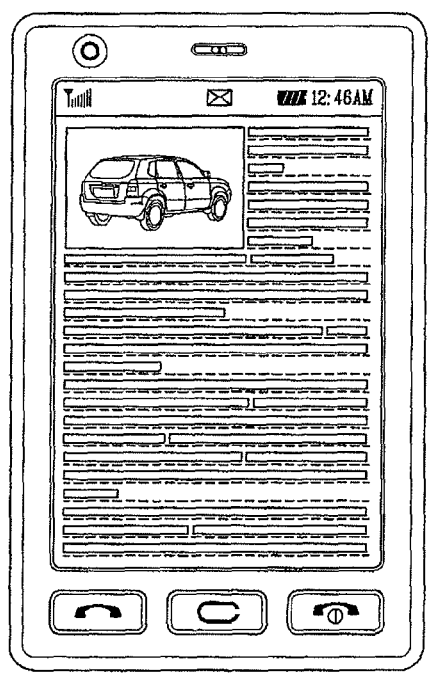
(a)
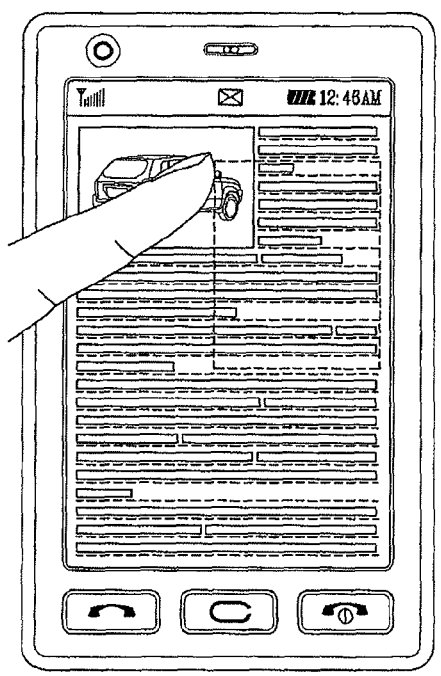
(b)
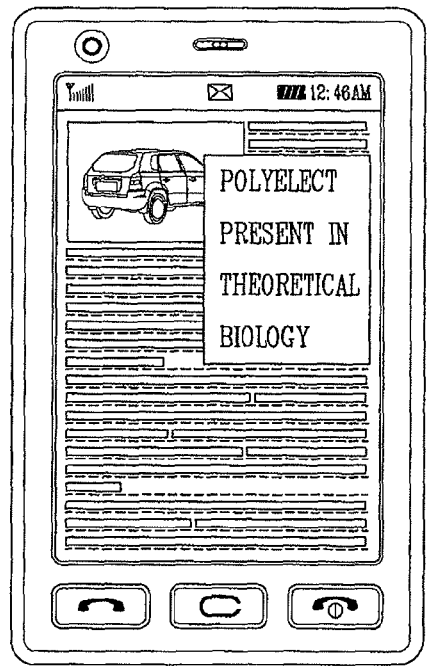
(c)

(a)  (b)

FIG. 9A
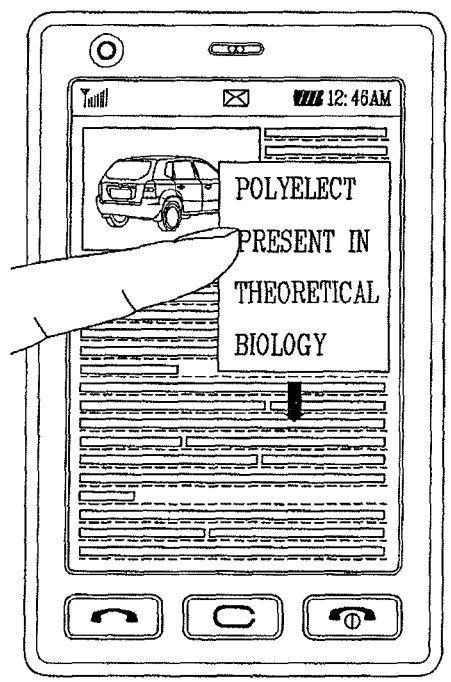
(a)
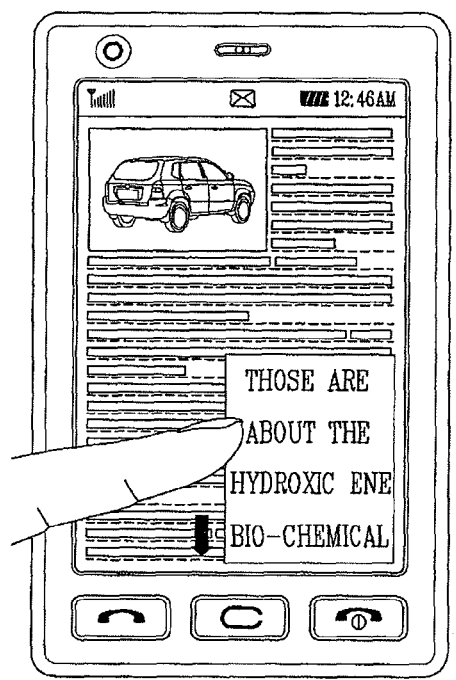
(b)
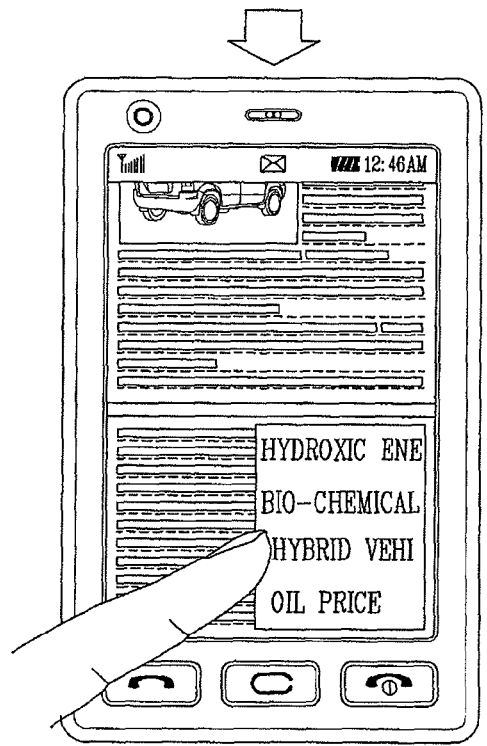
(c)

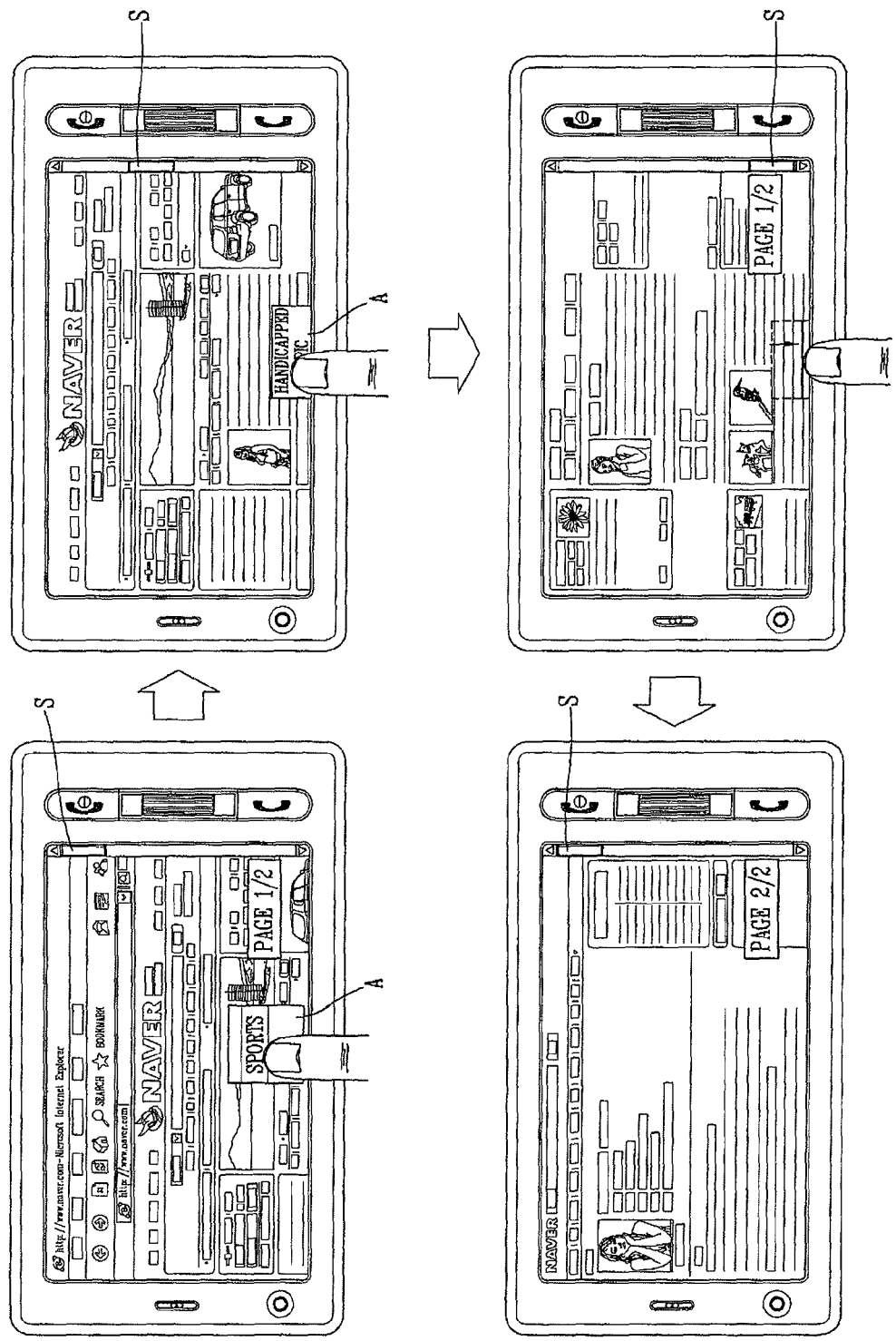

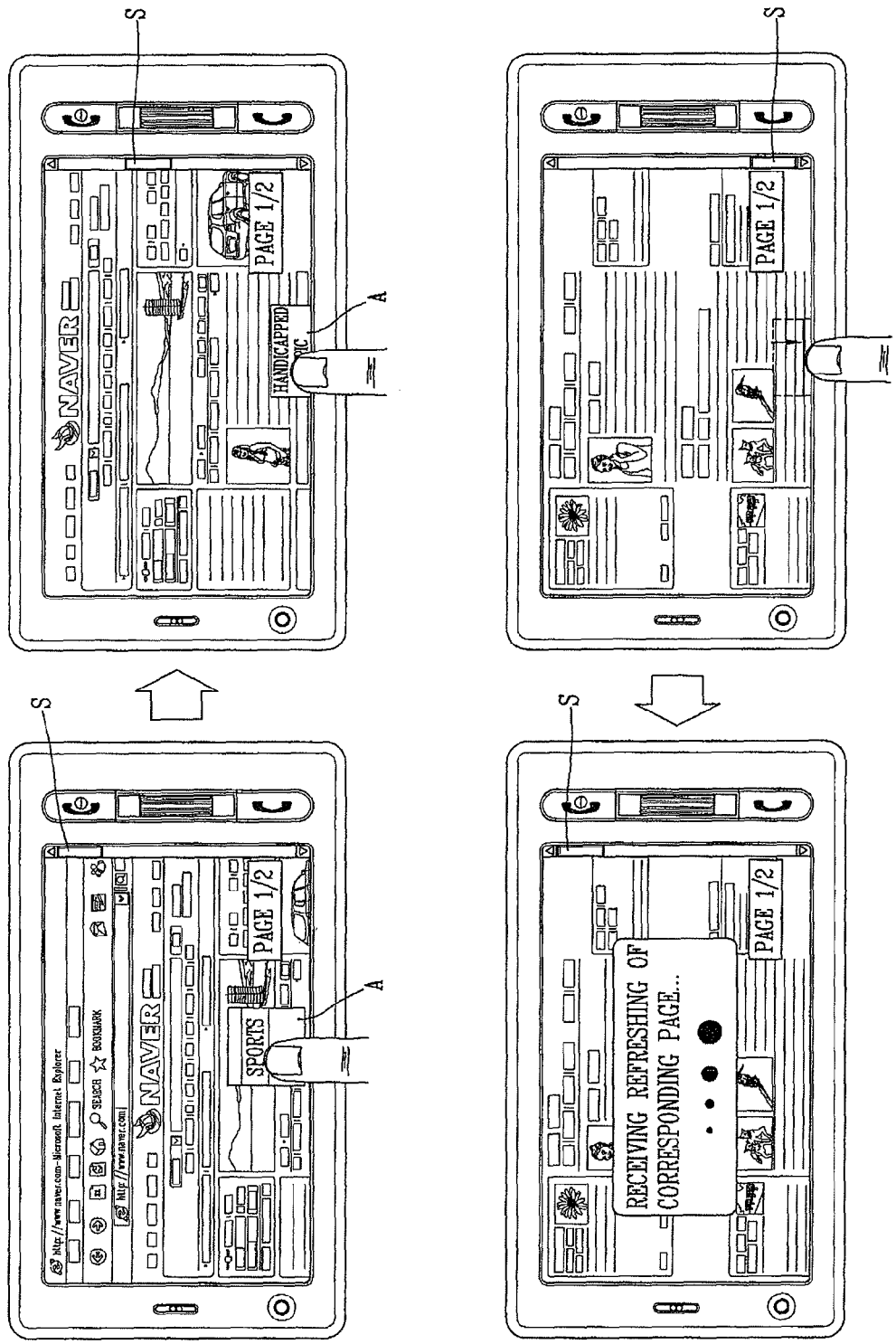

(a)   (b)

(a)   (b)

FIG. 13
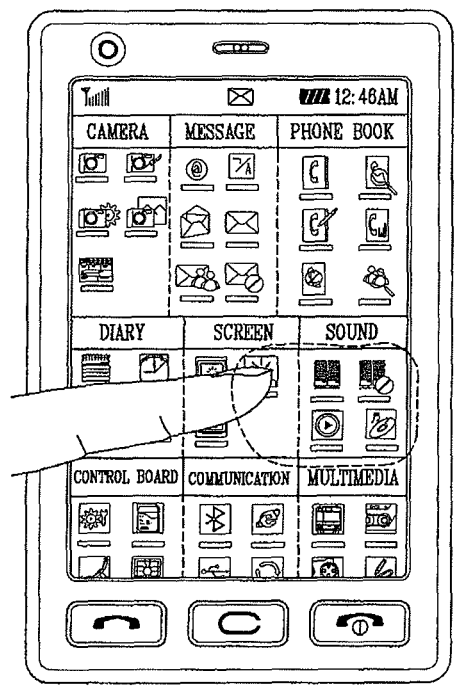
(a)
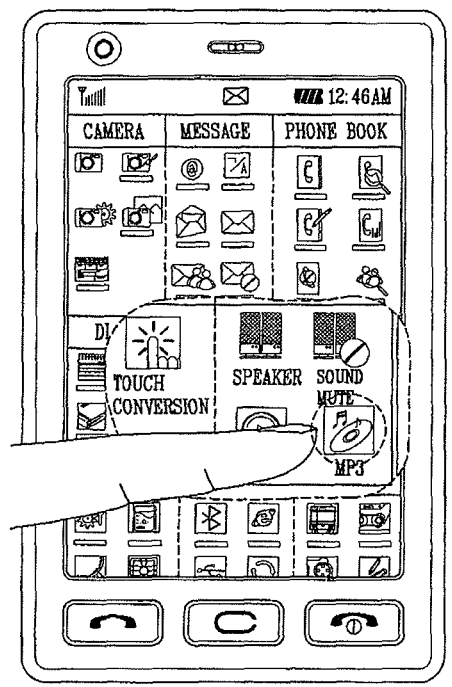
(b)
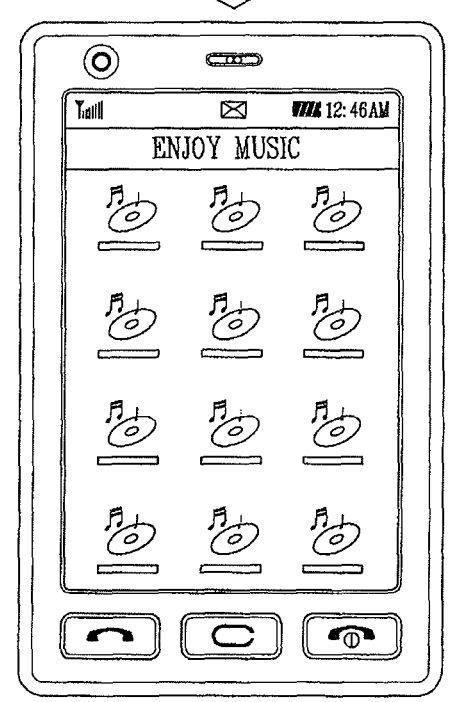
(c)

FIG. 14
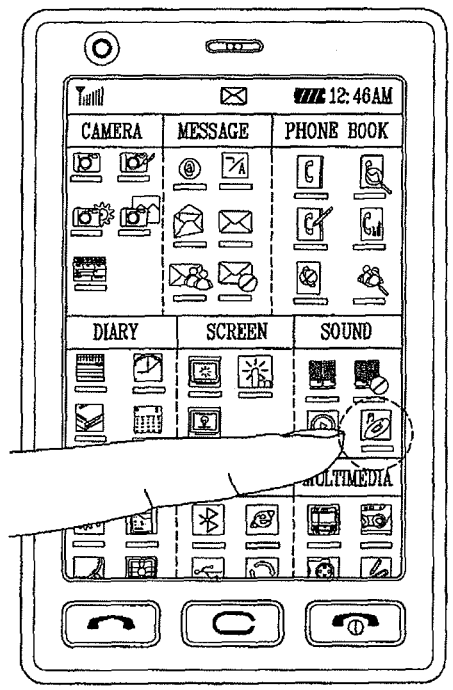
(a)
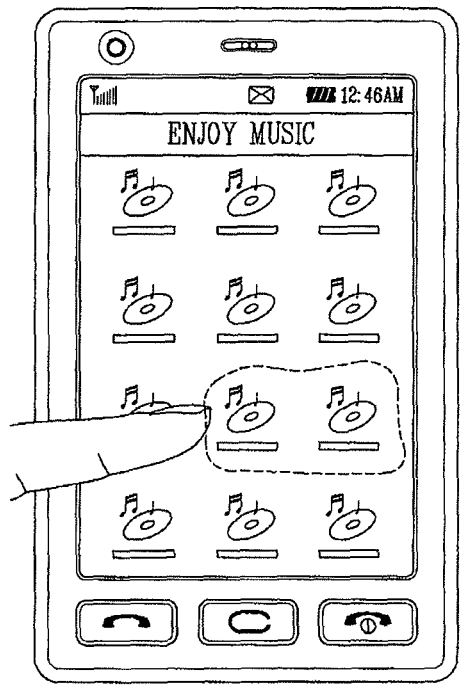
(b)
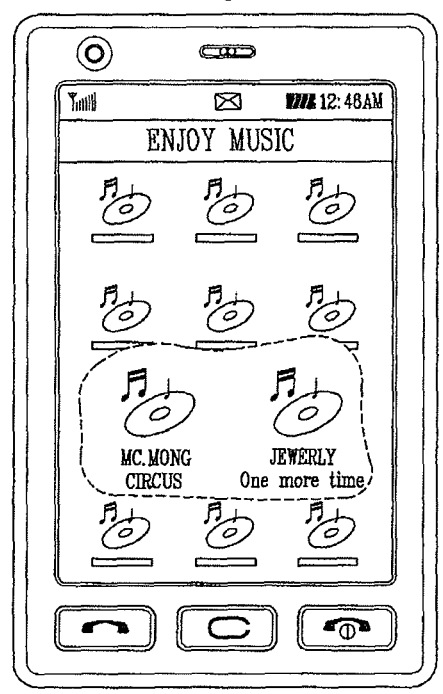
(c)

MOBILE TERMINAL AND USER INTERFACE OF MOBILE TERMINAL

CROSS-REFERENCE TO A RELATED APPLICATION

This application is a Continuation of U.S. patent application Ser. No. 13/562,930, filed Jul. 31, 2012, which is a Continuation of Ser. No. 12/421,276 filed on Apr. 9, 2009, now U.S. Pat. No. 8,259,136, issued Sep. 4, 2012, which claims priority to Korean Application No. 10-2008-0097748 filed on Oct. 6, 2008, the entire contents of which are hereby incorporated by reference in their entireties.

BACKGROUND OF THE INVENTION

1. Field of the Invention

The present invention relates to a mobile terminal and corresponding method for executing various functions of the mobile terminal by designating or setting a portion of a display.

2. Discussion of the Related Art

Terminals can be divided into a mobile terminal (portable terminal) and a stationary terminal according to whether or not the terminal is portable. Mobile terminals can also be divided into a handheld terminal that can be directly carried around and a vehicle mounted terminal.

Terminals also include multimedia players having complex functions such as capturing images or video, reproducing music or video files, playing games, receiving broadcasts, etc. In addition, because terminals offer a large selection of functions, the mobile terminals also include user interfaces that allow the user to traverse through and execute the different functions.

Also, because mobile terminals are generally small in size, the different icons or buttons on the terminal are also small in size so that several icons or buttons can be provided on the user interface. In addition, in the related art mobile terminal, similar function execution icons are grouped together, and an icon representing the grouped function execution icons is displayed on the display unit. Thus, to select a function execution icon, a user has to traverse through several top level icons to access the desired icon.

SUMMARY OF THE INVENTION

Accordingly, one object of the present invention is to address the above-noted and other problems.

Another object of the present invention is to provide a mobile terminal and corresponding method for applying various functions to information displayed on a display unit of the mobile terminal based on a user designating a portion of the display unit.

Yet another object of the present invention is to provide a mobile terminal and corresponding method for simplifying the process for selecting a menu to execute a function on the mobile terminal.

Still another object of the present invention to provide a mobile terminal and corresponding method for allowing a user to scroll various information through simple and intuitional manipulation on a display unit with a limited size.

To achieve these and other advantages and in accordance with the purpose of the present invention, as embodied and broadly described herein, the present invention provides in one aspect a method of controlling a mobile terminal and which includes displaying contents on a display screen of the terminal, receiving a signal indicating a portion of the display screen on the mobile terminal has been designated, and executing, via a control unit, a preset function corresponding to an output mode of information contained in the designated portion of the display screen.

In another aspect, the present invention provides a mobile terminal including a display unit configured to display contents, a receiving unit configured to receive a signal indicating a portion of the display screen on the mobile terminal has been designated, and a control unit configured to execute a preset function corresponding to an output mode of information contained in the designated portion of the display screen.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 1 is a block diagram of a mobile terminal according to one embodiment of the present invention;

FIG. 6 is a front view of the mobile terminal employing a user interface according to one embodiment of the present invention;

FIGS. 9A to 9E are front views of the mobile terminal having a scroll function according to one embodiment of the present invention;

FIGS. 13 and 14 are front views of the mobile terminal displaying a plurality of function execution icons according to another embodiment of the present invention.

DETAILED DESCRIPTION OF THE INVENTION

Figure 2A:
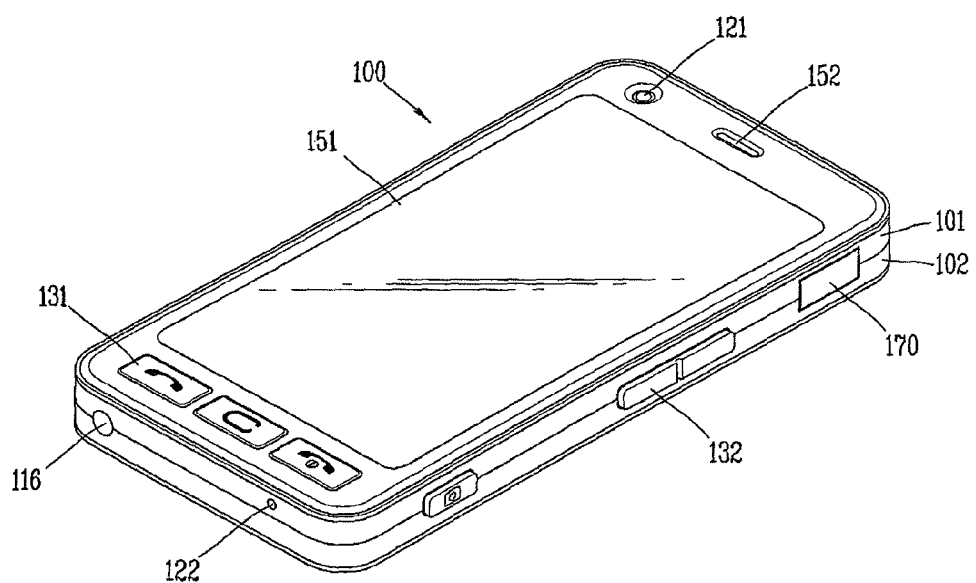
FIG. 2A is a front perspective view of the mobile terminal according to one embodiment of the present invention.

The mobile terminal according to exemplary embodiments of the present invention will now be described with reference to the accompanying drawings. In the following description, usage of suffixes such as 'module', 'part' or 'unit' used for referring to elements is given merely to facilitate explanation of the present invention.

In addition, the mobile terminal described in the present invention may include mobile phones, smart phones, notebook computers, digital broadcast terminals, PDAs (Personal Digital Assistants), PMPs (Portable Multimedia Player), navigation devices, etc. However, the present invention can be also applicable to fixed terminals such as digital TVs, desktop computers, etc.

FIG. 1 is a block diagram of mobile terminal 100 according to an embodiment of the present invention. As shown, the mobile terminal 100 includes a wireless communication unit 110, an A/V (Audio/Video) input unit 120, a user input unit 130, a sensing unit 140, an output unit 150, a memory 160, an interface unit 170, a controller 180, and a power supply unit 190, etc.

The wireless communication unit 110 may include one or more components allowing radio communication between the mobile terminal 100 and a wireless communication system or a network in which the mobile terminal is located. For example, the wireless communication unit 110 in FIG. 1 includes a broadcast receiving module 111, a mobile communication module 112, a wireless Internet module 113, a short-range communication module 114, and a location information module 115, etc.

The broadcast receiving module 111 receives broadcast signals and/or broadcast associated information from an external broadcast management server via a broadcast channel. In addition, the broadcast channel may include a satellite channel and a terrestrial channel. Also, the broadcast management server refers to a server that generates and transmits a broadcast signal and/or broadcast associated information or a server that receives a previously generated broadcast signal and/or broadcast associated information and transmits the same to a terminal. Further, the broadcast signal may include not only a TV broadcast signal, a radio broadcast signal and a data broadcast signal, but also a broadcast signal obtained by combining a data broadcast signal to the TV or radio broadcast signal.

In addition, the broadcast associated information may be information related to a broadcast channel, a broadcast program or a broadcast service provider. The broadcast associated information may be provided via a mobile communication network. In this instance, the broadcast associated information may be received by the mobile communication module 112.

Further, the broadcast associated information may exist in various forms. For example, the broadcast associated information may be in the form of an electronic program guide (EPG) of a digital multimedia broadcasting (DMB) system, an electronic service guide (ESG) of a digital video broadcast-handheld (DVB-H) system, etc. In addition, the broadcast receiving module 111 may receive digital broadcast signals by using digital broadcast systems such as the multimedia broadcasting-terrestrial (DMB-T) system, the digital multimedia broadcasting-satellite (DMB-S) system, the media forward link only (MediaFLO®) system, the digital video broadcast-handheld (DVB-H) system, the integrated services digital broadcast-terrestrial (ISDB-T) system, etc. The broadcast receiving module 111 may also be configured to be suitable for any other broadcast systems as well as the above-described digital broadcast systems.

In addition, broadcast signals and/or broadcast-associated information received via the broadcast receiving module 111 may be stored in the memory 160. The mobile communication module 112 also transmits and receives radio signals to and from at least one of a base station, an external terminal and a server. Such radio signals may include a voice call signal, a video call signal or various types of data according to text/multimedia message transmission and reception. Further, the wireless Internet module 113 refers to a module for a wireless Internet access, and may be internally or externally coupled to the terminal. The wireless Internet technique may include a WLAN (Wireless LAN) (Wi-Fi), Wibro (Wireless broadband), Wimax (World Interoperability for Microwave Access), HSDPA (High Speed Downlink Packet Access), etc.

In addition, the short-range communication module 114 refers to a module for short-range communication. As the short range communication technologies, Bluetooth, radio frequency identification (RFID), infrared data association (IrDA), ultra-wideband (UWB), ZigBee, etc. may be used. The location information module 115 is a module for checking or acquiring a location of the mobile terminal. A GPS (Global Positioning System) module is a typical example of the location information module 115.

With reference to FIG. 1, the A/V input unit 120 is configured to receive an audio or video signal. In FIG. 1, the A/V input unit 120 includes a camera 121, a microphone 122, etc. The camera 121 processes image frames of still pictures or video, and the processed image frames may be displayed on a display unit 151. Further, the image frames processed by the camera 121 may be stored in the memory 160 or transmitted externally via the wireless communication unit 110. Two or more cameras 121 may also be provided according to a usage environment.

In addition, the microphone 122 receives an external audio signal while in a phone call mode, a recording mode, a voice recognition mode, etc., and processes the signal into electrical audio data. The processed audio data may also be converted for output into a format transmittable to a mobile communication base station via the mobile communication module 112 for the phone call mode. The microphone 122 may also include various types of noise canceling algorithms to cancel noise generated in the course of receiving and transmitting external audio signals.

Further, the user input unit 130 generates input data to control an operation of the mobile terminal, and may include a keypad, a dome switch, a touch pad (e.g., static pressure/capacitance), a jog wheel, a jog switch, etc. In addition, the sensing unit 140 detects a current status of the mobile terminal 100 such as an opened or closed state of the mobile terminal 100, a location of the mobile terminal 100, a presence or absence of user contact with the mobile terminal 100, an orientation of the mobile terminal 100, an acceleration or deceleration movement of the mobile terminal 100, etc., and generates a sensing signal for controlling the operation of the mobile terminal 100. For example, when the mobile terminal 100 is a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device. The sensing unit 140 may also include a proximity sensor 141.

Also, the output unit 150 generates an output related to the sense of sight, the sense of hearing or the sense of touch and may include the display unit 151, an audio output module 152, an alarm unit 153, and a haptic module 154. The display unit 151 displays information processed in the mobile terminal 100. For example, when the mobile terminal 100 is in a phone call mode, the display unit 151 displays a User Interface (UI) or a Graphic User Interface (GUI) associated with a call. When the mobile terminal 100 is in a video call mode or image capturing mode, the display unit 151 may display a captured image and/or received image, a UI or GUI. The display unit 151 may also include at least one of a Liquid Crystal Display (LCD), a Thin Film Transistor-LCD (TFT-LCD), an Organic Light Emitting Diode (OLED), a flexible display and a three-dimensional (3D) display.

In addition, the display unit 151 also may be configured to be transparent to allow viewing of the exterior therethrough, and is referred to as a transparent display. A transparent display may be, for example, a TOLED (Transparent Organic Light Emitting Diode), or the like. The rear structure of the display unit 151 may also include a light transmissive structure. With such a structure, the user can view an object located at a rear side of the terminal body through the region occupied by the display unit 151 of the terminal body. The mobile terminal 100 may also include two or more display units. For example, a plurality of display units may be separately or integrally disposed on one surface or disposed on both surfaces of the mobile terminal.

Also, when the display unit 151 and a sensor (referred to as a 'touch sensor', hereinafter) are overlaid in a layered manner (referred to as a 'touch screen', hereinafter), the display unit 151 may be used as both an input device and an output device. The touch sensor may have the form of, for example, a touch film, a touch sheet, a touch pad, etc. The touch sensor may be configured to convert a pressure applied to a particular portion of the display unit 151 or a change in capacitance at a particular portion of the display unit 151 into an electrical input signal. The touch sensor may also be configured to detect the pressure when a touch is applied, as well as a touched position or area.

Further, when a touch operation with respect to the touch sensor is input, a corresponding signal or signals are transmitted to a touch controller. The touch controller then processes the signal (signals) and transmit corresponding data to the controller 180. Thus, the controller 180 can recognize which portion of the display unit 151 has been touched. With reference to FIG. 1, the proximity sensor 141 may be disposed within the mobile terminal covered by the touch screen or near the touch screen. The proximity sensor 141 refers to a sensor for detecting the presence or absence of an object that accesses a certain detect surface or an object that exists nearby by using the force of electromagnetism or infrared rays without a mechanical contact. Thus, the proximity sensor 141 has a longer life span compared with a contact type sensor, and it can be utilized for various purposes.

The proximity sensor 141 may also be a transmission type photo sensor, a direct reflection type photo sensor, a mirror-reflection type photo sensor, an RF oscillation type proximity sensor, a capacitance type proximity sensor, a magnetic proximity sensor, an infrared proximity sensor. When the touch screen is an electrostatic type touch screen, an approach of the pointer is detected based on a change in an electric field according to the approach of the pointer. In this instance, the touch screen (touch sensor) may be classified as a proximity sensor.

In the following description, the recognition of the pointer positioned to be close to the touch screen without contacting the touch screen will be called a 'proximity touch', while recognition of actual contacting of the pointer on the touch screen will be called a 'contact touch'. Also, when the pointer is in the state of the proximity touch, the pointer is positioned to correspond vertically to the touch screen. In addition, the proximity sensor 141 detects a proximity touch and a proximity touch pattern (e.g., a proximity touch distance, a proximity touch speed, a proximity touch time, a proximity touch position, a proximity touch movement state, or the like), and information corresponding to the detected proximity touch operation and the proximity touch pattern can be outputted to the touch screen.

In addition, the audio output module 152 may output audio data received from the wireless communication unit 110 or stored in the memory 160 in a call signal reception mode, a call mode, a record mode, a voice recognition mode, a broadcast reception mode, and the like. Further, the audio output module 152 may provide audible outputs related to a particular function (e.g., a call signal reception sound, a message reception sound, etc.) performed in the mobile terminal 100. The audio output module 152 may also include a receiver, a speaker, a buzzer, etc.

In addition, the alarm unit 153 outputs a signal for informing a user about an occurrence of an event of the mobile terminal 100. Events generated in the mobile terminal may include call signal reception, message reception, key signal inputs, a touch input etc. In addition to video or audio signals, the alarm unit 153 may output signals in a different manner, for example, to inform the user about an occurrence of an event. The video or audio signals may be also output via the audio output module 152, and thus the display unit 151 and the audio output module 152 may be classified as parts of the alarm unit 153.

Further, the haptic module 154 generates various tactile effects the user may feel. One example of the tactile effects generated by the haptic module 154 is vibration. The strength and pattern of the haptic module 154 can also be controlled. For example, different vibrations may be combined and output or sequentially output. Besides vibration, the haptic module 154 may generate various other tactile effects including an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat, etc. The haptic module 154 may also be implemented to allow the user to feel a tactile effect through a muscle sensation such as fingers or arm of the user, as well as transferring the tactile effect through a direct contact. Two or more haptic modules 154 may also be provided according to the configuration of the mobile terminal 100.

In addition, the memory 160 may store software programs used for the processing and controlling operations performed by the controller 180, and/or may temporarily store data (e.g., a phonebook, messages, still images, video, etc.) that are input or output. Further, the memory 160 may store data regarding various patterns of vibrations and audio signals output when a touch is input to the touch screen. The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

Further, the interface unit 170 serves as an interface with external devices connected with the mobile terminal 100. For example, the interface 170 may transmit data to an external device, receive and transmit power to each element of the mobile terminal 100, or transmit internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via a port.

In addition, when the mobile terminal 100 is connected with an external cradle, the interface unit 170 may serve as a passage to allow power from the cradle to be supplied therethrough to the mobile terminal 100 or may serve as a passage to allow various command signals input by the user from the cradle to be transferred to the mobile terminal therethrough. Various command signals or power input from the cradle may operate as signals for recognizing that the mobile terminal is properly mounted on the cradle.

Further, the controller 180 controls the general operations of the mobile terminal. For example, the controller 180 performs controlling and processing associated with voice calls, data communications, video calls, and the like. In FIG. 1, the controller 180 includes a multimedia module 181 for reproducing multimedia data. The multimedia module 181 may also be configured within the controller 180 or may be configured to be separated from the controller 180. The controller 180 may also perform a pattern recognition processing to recognize a handwriting input or a picture drawing input performed on the touch screen as characters or images, respectively. Also, the power supply unit 190 receives external power or internal power and supplies appropriate power required for operating respective elements and components under the control of the controller 180.

In addition, various embodiments described herein may be implemented in a computer-readable or its similar medium using, for example, software, hardware, or any combination thereof. For a hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented in the controller 180. For a software implementation, the embodiments such as procedures or functions may be implemented together with separate software modules that allow performing of at least one function or operation. Software codes can be implemented by a software application (or program) written in any suitable programming language. The software codes may be stored in the memory 160 and executed by the controller 180.

Next, FIG. 2A is a front perspective view of the mobile terminal according to an embodiment of the present invention. As shown in FIG. 2A, the mobile terminal has a bar type terminal body. However, the present invention is not limited to this configuration and may be applicable to a slide type mobile terminal, a folder type mobile terminal, a swing type mobile terminal, a swivel type mobile terminal, etc., in which two or more bodies are combined to be relatively movable.

In addition, the terminal body includes a case (or casing, housing, cover, etc.) constituting the external appearance. In this embodiment, the case includes a front case 101 and a rear case 102. Various electronic components are installed in the space between the front case 101 and the rear case 102. One or more intermediate cases may be additionally disposed between the front case 101 and the rear case 102. The cases may also be formed by injection-molding a synthetic resin or may be made of a metallic material such as stainless steel (STS) or titanium (Ti), etc.

Further, the display unit 151, the audio output module 152, the camera 121, the user input unit 130 including user inputs 131 and 132, the microphone 122, the interface unit 170, etc. are disposed mainly on the front case 101. As shown, the display unit 151 takes most portion of a circumferential surface of the front case 101. Also, the audio output unit 152 and the camera 121 are disposed at a region adjacent to one end portion among both end portions of the display unit 151, and the user input unit 131 and the microphone 122 are disposed at a region adjacent to another end portion. The user input unit 132 and the interface unit 170 may also be disposed at the sides of the front case 101 and the rear case 102.

In addition, the user input unit 130 is manipulated to receive a command for controlling the operation of the mobile terminal 100 and in this example includes the manipulation units 131 and 132. The manipulation units 131 and 132 may be generally referred to as a manipulating portion, and various methods and techniques can be employed for the manipulation portion so long as they preferably can be operated by the user in a tactile manner. Also, the content input by the first and second manipulation units 131 and 132 can be variably set. For example, the first manipulation unit 131 may receive a command such as starting, ending, scrolling, etc., and the second manipulation unit 32 may receive a command such as controlling of the size of a sound outputted from the audio output unit 152 or conversion into a touch recognition mode of the display unit 151.

Figure 2B:
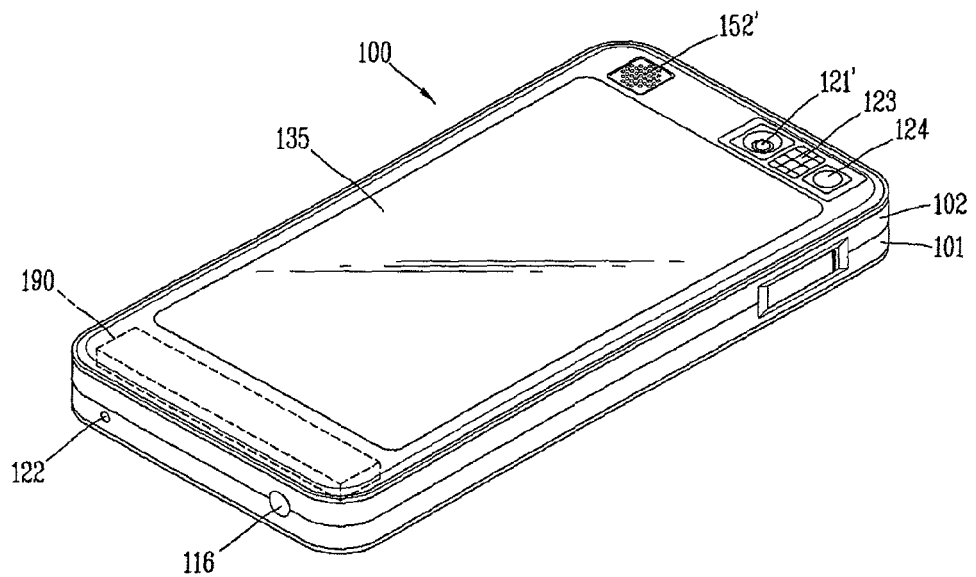
FIG. 2B is a rear perspective view of the mobile terminal according to one embodiment of the present invention.

Next, FIG. 2B is a rear perspective view of the mobile terminal as shown in FIG. 2A. With reference to FIG. 2B, a camera 121' may additionally be disposed on the rear surface of the terminal body, namely, on the rear case 102. The camera 121' may have an image capture direction which is substantially opposite to that of the camera 121 (FIG. 2A), and have a different number of pixels than the camera 121. For example, the camera 121 may have a smaller number of pixels to capture an image of the user's face and transmit such image to another party, and the camera 121' may have a larger number of pixels to capture an image of a general object and not immediately transmit it in most instances. The cameras 121 and 121' may also be installed on the terminal body such that they can be rotatable or popped up.

FIG. 2B also illustrates a flash 123 and a mirror 124 disposed adjacent to the camera 121'. When an image of a subject is captured with the camera 121', the flash 123 illuminates the subject. The mirror 124 allows the user to see himself or herself when he or she wants to capture their own image (i.e., self-image capturing) by using the camera 121'. An audio output unit 152' is also disposed on the rear surface of the terminal body. The audio output module 152' may implement stereophonic sound functions in conjunction with the audio output module 152 (FIG. 2A) and may be also used for implementing a speaker phone mode for call communication.

In addition, a broadcast signal receiving antenna 116 is disposed at the side of the terminal body, in addition to an antenna that is used for mobile communications. The antenna 116 constituting a portion of the broadcast receiving module 111 (FIG. 1) can also be configured to be retractable from the terminal body. FIG. 1 also illustrates the broadcast receiving antenna 116. The power supply unit 190 for supplying power to the mobile terminal 100 is also mounted on the terminal body. The power supply unit 190 may also be installed within the terminal body or may be directly attached to or detached from the exterior of the terminal body.

Further, a touch pad 135 for detecting a touch is mounted on the rear case 102. The touch pad 135 may be configured to be light transmissive like the display unit 151. In this instance, when the display unit 151 is configured to output visual information from both sides thereof, the visual information may be recognized also via the touch pad 135. Alternatively, a display may be additionally mounted on the touch pad so that a touch screen may be disposed on the rear case 102. The touch pad 135 is also operated in association with the display unit 151 of the front case 101. The touch pad 135 may be disposed to be parallel on the rear side of the display unit 151 and may have the same size as the display unit 151 or have a smaller size.

Figure 3A:
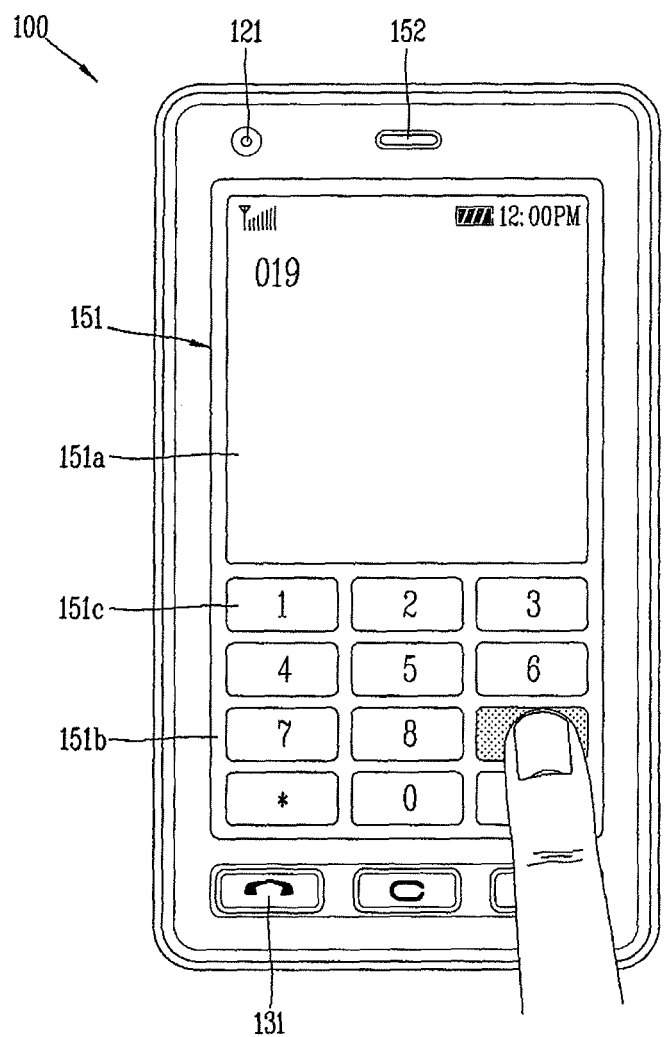
FIGS. 3A and 3B are front views of the mobile terminal for explaining an operation state of the mobile terminal according to an embodiment of the present invention.
Figure 3B:
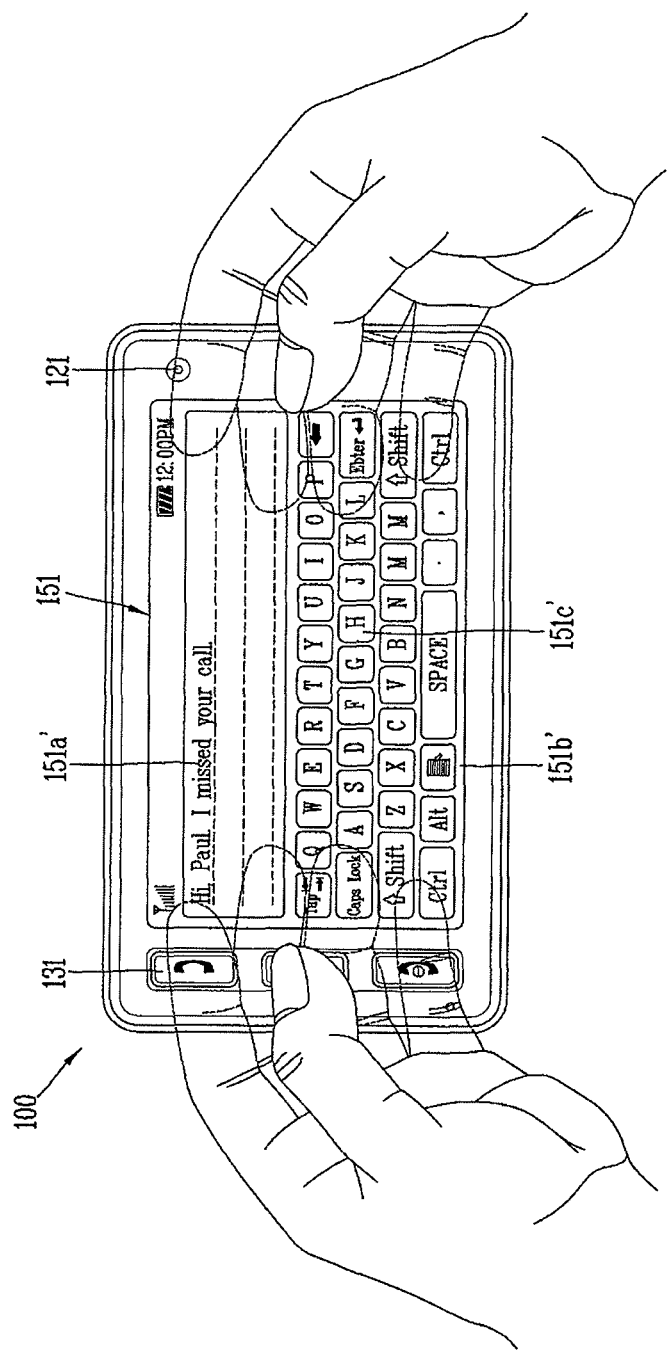

The associated operation of the display unit 151 and the touch pad 135 will now be described with reference to FIGS. 3A and 3B. In more detail, FIGS. 3A and 3B are front views of the mobile terminal and are used to explain an operation state of the mobile terminal according to an embodiment of the present invention. Further, various types of visual information may be displayed on the display unit 151. The information may also be displayed in the form of a character, number, symbol, graphic, icon, etc. Also, to input the information, at least one of the character, number, symbol, graphic and icon is displayed in a certain arrangement so as to be implemented in the form of a keypad. Such keypad may be called a 'soft key'.

FIG. 3A shows receiving a touch applied to a soft key on the front surface of the terminal body. Also, the display unit 151 may be operated as a whole region or may be divided into a plurality of regions and accordingly operated. In the latter instance, the plurality of regions may be operated in association with each other. For example, an output window 151a and an input window 151b may be displayed at upper and lower portions of the display unit 151, respectively. Soft keys 151c including numbers for inputting a phone number or the like are also disposed on the input window 151b. Thus, when the soft key 151c is touched, a number corresponding to the touched soft key is displayed on the output window 151a. When the first manipulation unit 131 is manipulated, a call connection with respect to a phone number displayed on the output window 151a is attempted.

FIG. 3B shows receiving of a touch applied to the soft key through the rear surface of the terminal body. If FIG. 3A shows a portrait in which the terminal body is disposed vertically, FIG. 3B shows a landscape in which the terminal body is disposed horizontally. The display unit 151 may also be configured to convert an output screen image according to the disposition direction of the terminal body. FIG. 3B also shows an operation of a text input mode in the mobile terminal. As shown, an output window 151a' and an input window 151b' are displayed on the display unit 151. A plurality of soft keys 151c' including at least one of characters, symbols and numbers are also arranged on the input window 151b'. The soft keys 151c' may also be arranged in the form of Qwerty keys.

In addition, when the soft keys 151c' are touched through the touch pad 135, characters, numbers, symbols, or the like, corresponding to the touched soft keys are displayed on the output window 151a'. Compared with a touch input through the display unit 151, a touch input through the touch pad 135 can advantageously prevent the soft keys 151c' from being covered by a user's fingers when a touching action is performed. When the display unit 151 and the touch pad 135 are formed to be transparent, the user's fingers put on the rear surface of the terminal body can be viewed, so the touch input can be more accurately performed.

Besides the input methods presented in the above-described embodiments, the display unit 151 or the touch pad 135 may be configured to receive a touch operation through scrolling. That is, the user may move a cursor or a pointer positioned on an entity, e.g., an icon or the like, displayed on the display unit 151 by scrolling the display unit 151 or the touch pad 135. In addition, when the user moves his or her fingers on the display unit 151 or the touch pad 135, the path along which the user's fingers move may be visually displayed on the display unit 151. This would be useful in editing an image displayed on the display unit 151.

In addition, one function of the terminal may be executed when the display unit 151 (touch screen) and the touch pad 135 are touched together within a certain time range. Both touches may be clamping the terminal body with the user's thumb and index finger. The one function may be, for example, activation or deactivation of the display unit 151 or the touch pad 135.

Figure 4:
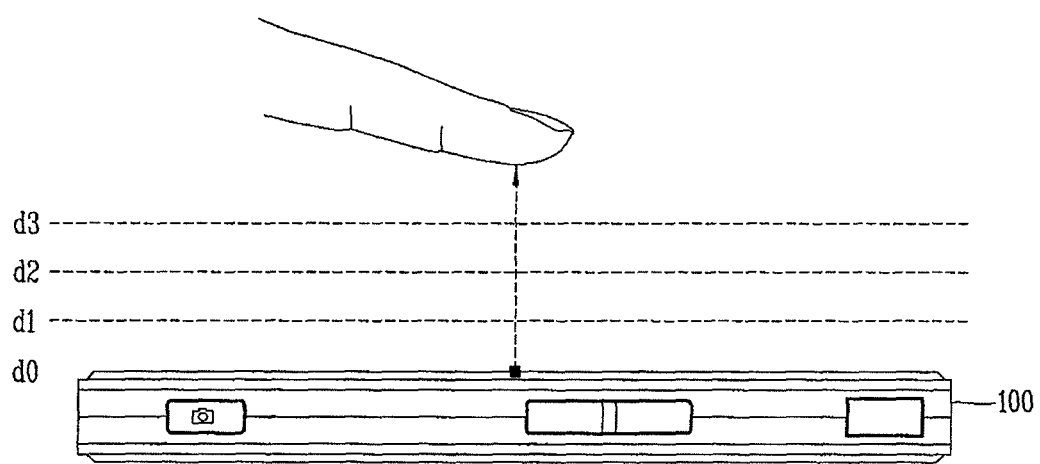
FIG. 4 is a conceptual view for explaining a proximity depth of a proximity sensor.

Next, the proximity sensor 141 will be described in more detail with reference to FIGS. 1 and 4. In more detail, FIG. 4 is a conceptual view for explaining the depth of proximity of the proximity sensor. As shown in FIG. 4, when a pointer such as the user's finger, a pen, or the like, approaches the touch screen, the proximity sensor 141 disposed within or near the touch screen detects it and outputs a proximity signal. The proximity sensor 141 may be configured to output a different proximity signal according to the distance (referred to as a 'proximity depth', hereinafter) between the closely touched pointer and the touch screen.

FIG. 4 also shows the section of the touch screen with the proximity sensor for detecting, for example, three proximity depths. The proximity sensor may detect three or less or four or more proximity depths. In more detail, when the pointer is brought into contact with the touch screen D0, it is recognized as a contact touch. When the pointer is positioned to be spaced apart by shorter than a distance D1 on the touch screen, it is recognized as a proximity touch with a first proximity depth. If the pointer is positioned to be spaced apart by the distance longer than the distance D1, but shorter than a distance D2 on the touch screen, it is recognized as a proximity touch with a second proximity depth. If the pointer is positioned to be spaced apart by the distance longer than the distance D2, but shorter than a distance D3, it is recognized as a proximity touch with a third proximity depth. If the pointer is positioned to be spaced apart by longer than the distance D3 on the touch screen, it is recognized that the proximity touch has been released. Accordingly, the controller 180 may recognize the proximity touches as various input signals according to the proximity depths and proximity positions of the pointer, and may control various operations according to the various input signals.

Figure 5:
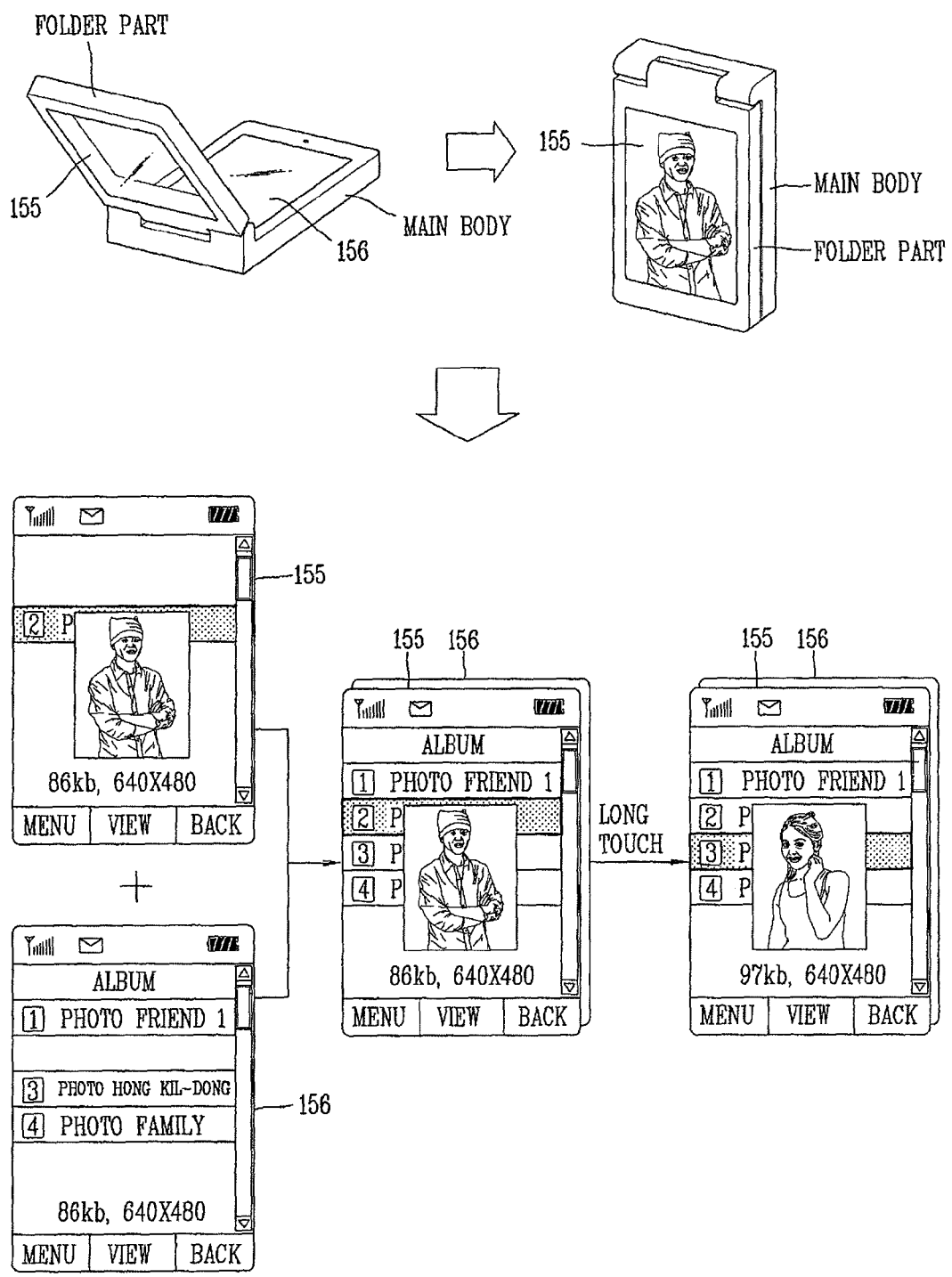
FIG. 5 is a conceptual view for explaining a control method with respect to a touch operation in a state that a pair of display units overlap.

Next, FIG. 5 is a conceptual view for explaining a method for controlling a touch operation in a configuration when a pair of display units 155 and 156 overlap with each other. Further, the terminal shown in FIG. 5 is a folder type terminal in which a folder part is foldably connected with the main body. The first display unit 155 mounted on the folder part may also be light-transmissive or transparent such as a TOLED, while the second display unit 156 mounted on the main body may not allow light transmission such as an LCD. The first and second display units 155 and 156 may also be configured as a touch screen through which a touch can be applied. For example, when a touch (contact touch or a proximity touch) with the TOLED is detected, the controller 180 may select or run at least one image on an image list displayed on the TOLED 155 according to a type of the touch or a touch duration.

Hereinafter, a method for controlling information displayed on a different display unit or on the LCD 156 when a touch is applied to the TOLED 155 exposed in an overlaid configuration will be described based on input methods discriminated by a single touch operation, a long touch operation, a long touch & dragging operation, and the like. In more detail, in the overlaid configuration (i.e., the mobile terminal is in a closed configuration), the TOLED 155 is disposed to be overlaid on the LCD 156. In this configuration, if a touch, namely, a long touch operation (e.g., a touch operation continued for longer than two or three seconds), which is different from the touch operation for controlling the image displayed on the TOLED 155, is detected, the controller 180 selects at least one image on the image list displayed on the LCD 156 according to the detected touch input. The result according to execution of the selected image is then displayed on the TOLED 155.

Further, the long touch operation may be used to selectively move a desired one of the entities displayed on the LCD 156 to the TOLED 155 (without execution a corresponding operation). Namely, when the user performs a long touch operation on one region of the TOLED 155 corresponding to a particular entity of the LCD 156, the controller 180 moves and displays the corresponding entity on the TOLED 155. Meanwhile, an entity displayed on the TOLED 155 may be also moved and displayed on the LCD 156 according to a certain touch input, e.g., flicking, swirling, or the like, with respect to the TOLED 155. FIG. 5 shows the situation where the menu No. 2 displayed on the LCD 156 has been moved and displayed on the TOLED 155.

Also, when a drag is detected together with a long touch operation, the controller 180 may display, for example, a preview screen image of a selected image according to a function related to the image selected by the long touch operation on the TOLED 155. FIG. 5 shows the situation where a preview (a photo image of a man) of the menu No. 2 (image file) has been performed. Also, with the preview screen image output, and when a dragging operation is additionally made on the TOLED 155 while the long touch operation is maintained, the controller 180 moves a select cursor (or a select bar) of the LCD 156 and displays an image selected by the select cursor on a preview screen (a photo image of a woman). Thereafter, when the touch (long touch and dragging) operation ends, the controller 180 displays the first image selected by the long touch operation.

In addition, the touch operation (long touch and dragging) can be applied in the same manner when a sliding operation (an operation of a proximity touch corresponding to the dragging operation) together with a long proximity touch operation (i.e., a proximity touch operation continued for longer than at least two to three seconds). When a touch operation other than the above-described operation is detected, the controller 180 may perform an operation in the same manner as the general touch control method. A control method for a touch operation in the overlap form may also be applied to a terminal having a single display. In addition, the control method can be also applicable to a folder type terminal having a dual-display and other terminals.

Further, according to an embodiment of the present invention and with reference to FIG. 1, the user input unit 130 receives a signal for setting or designating a region of the display unit 151, a signal for selecting at least one function of a function list applicable to information displayed on the set region of the display unit 151, and an additional signal related to an additional function to be applied to a magnified form of the information displayed at the set region of the display unit 151. Signals may also be input via the user input unit 130 by applying a touch operation onto the touch screen, by manipulating a jog wheel/dial, or based on a previous setting (mapping) such that each region of the display unit 151 or a function to be selected or an additional function corresponds to each key on the keypad and manipulating the keypad, or the like.

Further, the display unit 151 related to an embodiment of the present invention includes information related to an output mode, a list of functions applicable to the information displayed on the set region, the magnified form of the information displayed on the set region, application of an additional function to the magnified form, a plurality of function execution icons, or the like. The output mode refers to a pre-set mode to output information used for each function to allow the user to perform a desired function, a function execution icon, status display information of the mobile terminal, or the like.

In addition, the function execution icon is a user interface provided to the user to perform various functions of the mobile terminal 100. The functions of the mobile terminal 100 may be matched to the respective function execution icons, and when the user selects one of them, a function corresponding to the selected function execution icon is performed. The function execution icon may be implemented in the form of a graphic user interface (GUI).

Also, the controller 180 according to one embodiment of the present invention selects a function to be applied to the information displayed on the set region of the display unit 151 by using the set region and the output mode, applies the selected function, and applies an additional function related to an additional signal received via the user input unit 130. When a plurality of function execution icons are displayed on the display unit 151, the controller 180 checks the number of function execution icons within the set region of the display unit 151. If one function execution icon exists in the set region, the controller 180 executes a function corresponding to the function execution icon. If two or more function execution icons exist in the set region, the controller 180 magnifies the information displayed on the set region to a portion of the display unit 151. Further, the region where the magnified form is output may have the same size and position as a region previously set on the display unit 151 or may have a different form, size and position.

The mobile terminal according to another embodiment of the present invention will now be described with reference to the accompanying drawings. In more detail, the user input unit 130 may receive a signal for setting a region on the screen. The signal for setting a region on the screen may be input by applying a touch operation to the touch screen, by manipulating a jog wheel/dial, or by a previous setting (mapping) such that each region of the display unit 151 or a function to be selected or an additional function corresponds to each key of the keypad and manipulating the keypad, or the like. Further, the display unit 151 may magnify the information displayed on the set region at one region of the display unit 151. Also, the display unit 151 may change the one region and display the same according to a user input.

A signal for changing the magnified region may also be input by the user by applying a touch operation to the touch screen, by manipulating a jog wheel/dial, or by a previous setting (mapping) such that each region of the display unit 151 or a function to be selected or an additional function corresponds to each key of the keypad and manipulating the keypad, or the like. Among the signal input methods by the user, the touch input with respect to the touch screen may include a touch, dragging operation, flicking operation, two-point touch operation, etc., with respect to the magnified one region.

Further, the controller 180 may apply a scroll function to the information displayed on the screen according to a change in the magnified region. The controller 180 may also scroll the information displayed on the screen in the direction that one region of the screen is moved. When the one region of the screen contacts with a boundary of the screen, the controller 180 may scroll the information displayed on the screen. If the information displayed on the screen cannot be scrolled any further in the direction that the one region of the screen is moved, the controller 180 may perform at least one of a refreshing function or a page transition function.

In addition, the refreshing function refers to re-receiving information currently displayed on the screen from a network or the memory 160 and displaying the re-received information on the screen of the display unit 151. The page transition function refers to receiving information about a different page, not the page displayed on the screen of the display unit 151, from the network or the memory 160 and displaying the received information on the screen of the display unit 151. The controller 180 may also perform at least one of the refreshing function and the page transition function in the direction that one region of the screen is moved. For example, it may be set such that when one region of the screen is moved in a horizontal direction (landscape), the refreshing function is performed, and when one region of the screen is moved in a vertical direction (portrait), the page transition function is performed. The direction in which one region of the screen is moved and a function performed accordingly may be previously set or may be set according to a user input.

Also, when a portion of the magnified region of the display unit 151 is displayed to be in contact with the boundary of the screen, the controller 180 may perform an additional function according to an area ratio in which the portion of the magnified region of the screen takes up in the whole region. The additional function may be a function for differentiating the speed for scrolling according to the area ratio. For example, if only a half of the magnified screen image is displayed at the boundary of the screen, the scroll speed may be doubled compared with a normal scroll speed. In addition, if only one-fourth of the magnified screen image is displayed at the boundary of the screen, the scroll speed is doubled the case where only half of the magnified screen image displayed, namely, the scroll speed is quadrupled compared the normal scroll speed, in applying the scroll function.

Further, the area ratio of the magnified screen image displayed at the boundary of the screen may be changed according to a user input. For example, when the user puts the magnified region at the boundary of the screen by applying a touch input, the controller 180 controls the display unit 151 to scroll the information displayed on the screen. If the user additionally inputs a signal for moving the magnified region in the scroll direction, the controller 180 controls the display unit 151 to display only a portion of the magnified region. The controller 180 may also detect the area ratio of one portion of the magnified region to the whole magnified region and control the scroll speed according to the area ratio.

If the area ratio is lower than a pre-set value, the controller 180 may perform at least one of refreshing, page transition, and movement to a screen where scrolling cannot be performed any further in the scroll direction. For example, if a magnified region displayed on the screen is not larger than a half of the entire region in size, the controller 180 may perform at least one of refreshing, page transition, and movement to a screen where scrolling cannot be performed any further in the scroll direction. The controller 180 may also perform at least one of refreshing, page transition, and movement to a screen where scrolling cannot be performed any further in the scroll direction according to the direction in which the information displayed on the screen is scrolled.

Next, FIG. 6 is a front view of the mobile terminal employing a user interface according to one embodiment of the present invention. As shown in FIG. 6, various information or contents is displayed on the display unit 151 of the mobile terminal 100. In particular, FIG. 6 shows text document information including a photo image, and may include other various information such as a function execution icon or a web page on the Internet. In addition, the user input unit 130 receives a signal for setting a region of the display unit 151 input by the user. As shown in FIG. 6, the user may specify a region on the display unit 151 through a touch input. The method for setting a region on the display unit 151 may also include manipulation of a jog wheel or dial or manipulation of a corresponding key pad by a previous setting such that each region of the display unit 151 is matched to each key on the keypad.

When a region of the display unit 151 is set via the user input unit 130, the controller 180 stores information displayed at the set region. The controller 180 also selects a function to be applied to the information displayed at the set region by using the set region and an output mode. For example, assuming a current output mode is a mode for reading a document stored in the memory 160 or stored on the Internet, the function is set as a magnification function. When the user sets a portion of document information displayed on the display unit 151 while reading the document, the controller 180 applies the pre-set magnification function because the output mode is the document reading mode.

When the magnification function is applied, the magnified form of the information displayed on the set region is output to a portion of the display unit 151. Because the magnified form is output to the portion that is not the entire portion of the display unit 151, the user can view the entire region of the display unit 151 even after the portion of the display unit 151 is magnified and easily recognize the position of the magnified form in the entirely displayed information.

Figure 7:
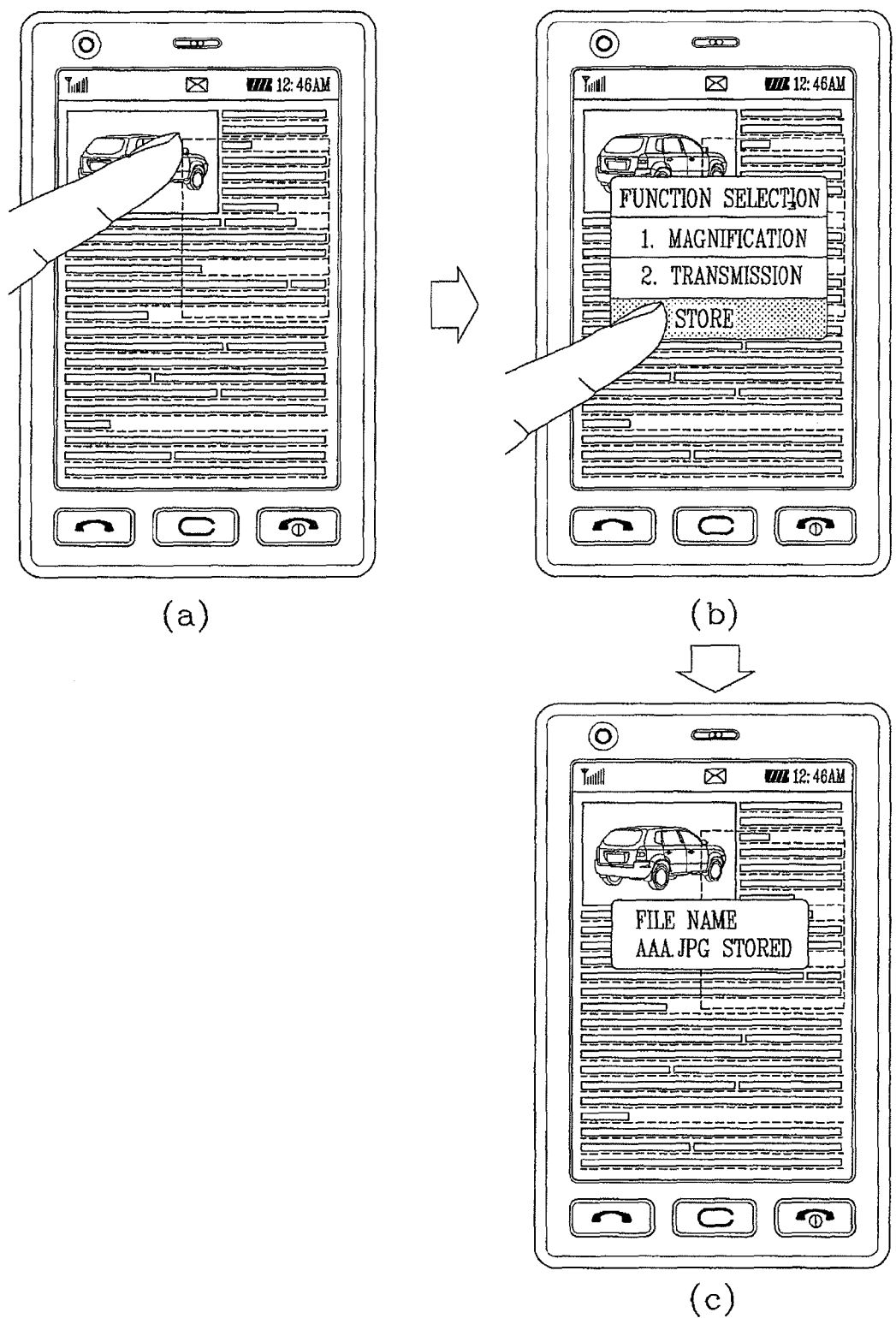
FIG. 7 is a front view of the mobile terminal employing a user interface according to another embodiment of the present invention.
Figure 8:
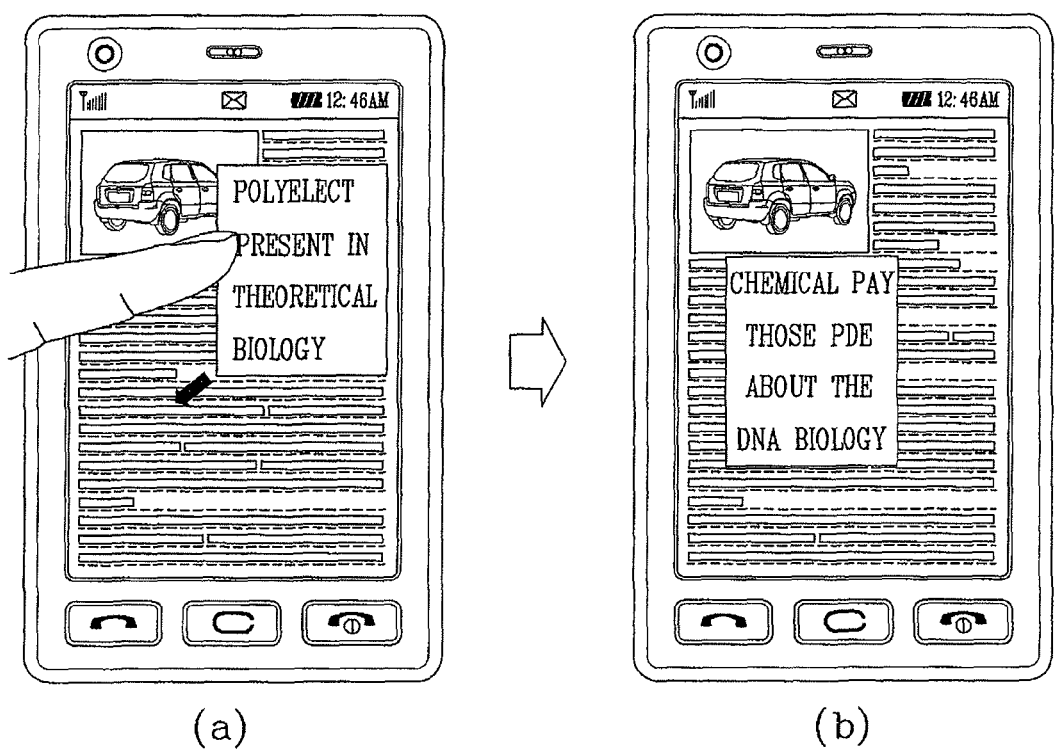
FIG. 8 is a front view of the mobile terminal having a region movement function according to one embodiment of the present invention.

Next, FIG. 7 is a front view of the mobile terminal employing a user interface according to another embodiment of the present invention. The method for selecting a function to be applied to the information displayed on the set region may be a method of outputting a list of functions applicable in the output mode by the display unit 151 and receiving a signal for selecting at least one of the functions on the output list by the user input unit 130.

As shown in FIGS. 7(*a*) and 7(*b*), when the user sets a portion of the display unit 151 through a touch input, the controller 180 determines an applicable function using the set region and the output mode. The controller 180 also outputs a list of the determined functions to the display unit 151. For example, assuming the output mode is a mode for reading a document stored in the memory 160 or on the Internet, applicable functions are the magnification function, a transmission function and a storage function. That is, when the user inputs a signal for setting a region of the display unit 151 in the document reading mode, the controller 180 determines that the applicable functions in the output mode are the magnification function, the transmission function and the storage function and displays the list of the functions on the display unit 151.

When the list of the functions is displayed on the display unit 151, a signal for selecting at least one of the functions on the list is received through the user input unit 130. FIG. 7 shows the user selecting functions through a touch input, but the function select signal may be also received through a keypad, a jog wheel/dial, etc. As shown in FIG. 7(c), when a function to be applied to the information displayed on the set region of the display unit 151 is selected by the function select signal, the result obtained by performing the applied function is output on the display unit 151.

Next, FIGS. 8 to 12 are front views of the mobile terminal employing an additional function according to one embodiment of the present invention. If the magnification function is applied to the information displayed on the set region of the display unit 151 and when an additional signal is received through the user input unit 130, the controller 180 may apply at least one additional function related to the additional signal. The method of inputting the additional signal may be performed by a touch input or by using the keypad or the jog dial/wheel.

As shown in FIG. 8(a), the additional function may be a function of changing the position of one region where the magnified form is output. In more detail, when the user touches the magnified form and drags it in an arbitrary direction on the display unit 151, the region where the magnified form is output may be moved in the arbitrary direction. When the magnified form-output region is moved, the information corresponding to the moved position may be magnified and output as shown in FIG. 8(b).

As shown in FIG. 9A, the additional function may be a function of scrolling the information displayed on the display unit 151. In more detail, when the user touches the magnified form and drags it in an arbitrary direction of the display unit 151, the function of changing the position of the one region is performed (see in particular FIGS. 9A(a) and 9A(b)). When the user keeps dragging, the position of the region where the magnified form is displayed can be moved up to the boundary of the display unit 151. If the user keeps dragging even after the position of the magnified form-displayed region is moved up to the boundary of the display unit 151, the information outputted to the display unit 151 may be scrolled in the arbitrary direction as shown in FIG. 9A(c).

Figure 9B:
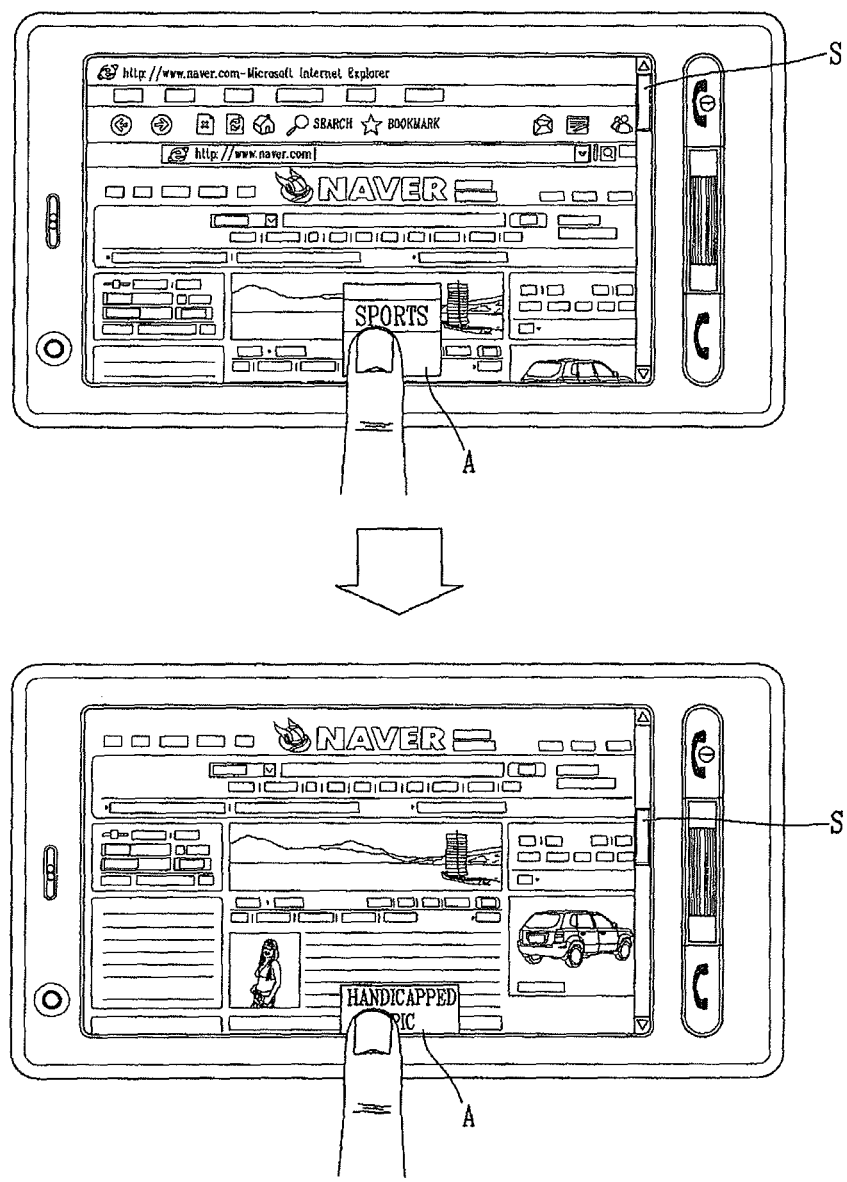

As shown in FIG. 9B, the information displayed on the screen may be scrolled according to a change in one region (A) set on the screen. When the user touches the one region (A) and drags it in one direction, the one region (A) is moved in the drag direction. When the one region (A) is moved to be in contact with the boundary of the screen, the information displayed on the screen can be scrolled. In the scrolling operation, the one region (A) may be displayed only partially. Also, a scroll bar (S) may be displayed on the screen to inform the position of the information displayed on the current screen in the entire information and the size of the region that can be scrolled.

As shown in FIG. 9C, if the information displayed on the screen cannot be scrolled any further in the direction that the one region of the screen is moved, the page transition function may be performed. When the screen (A) is scrolled in the direction that the magnified region is moved, the screen image in which scrolling cannot be performed any further in the scroll direction is displayed. In this instance, if the user moves the magnified region (A) in the scroll direction through an additional input, the page transition function to a different page may be performed.

As shown in FIG. 9D, when the information displayed on the screen cannot be scrolled any further in the direction that one region of the screen is moved, the refreshing function may be performed. In addition, at least one of the refreshing function and the page transition function may be performed according to the direction in which the one region of the screen is moved. For example, it may be set such that when one region of the screen is moved in a horizontal direction (landscape), the refreshing function is performed, and if one region of the screen is moved in a vertical direction (portrait), the page transition function is performed. The direction in which the one region of the screen is moved and a corresponding function performed accordingly may be previously set or set according to a user input.

Figure 9E:
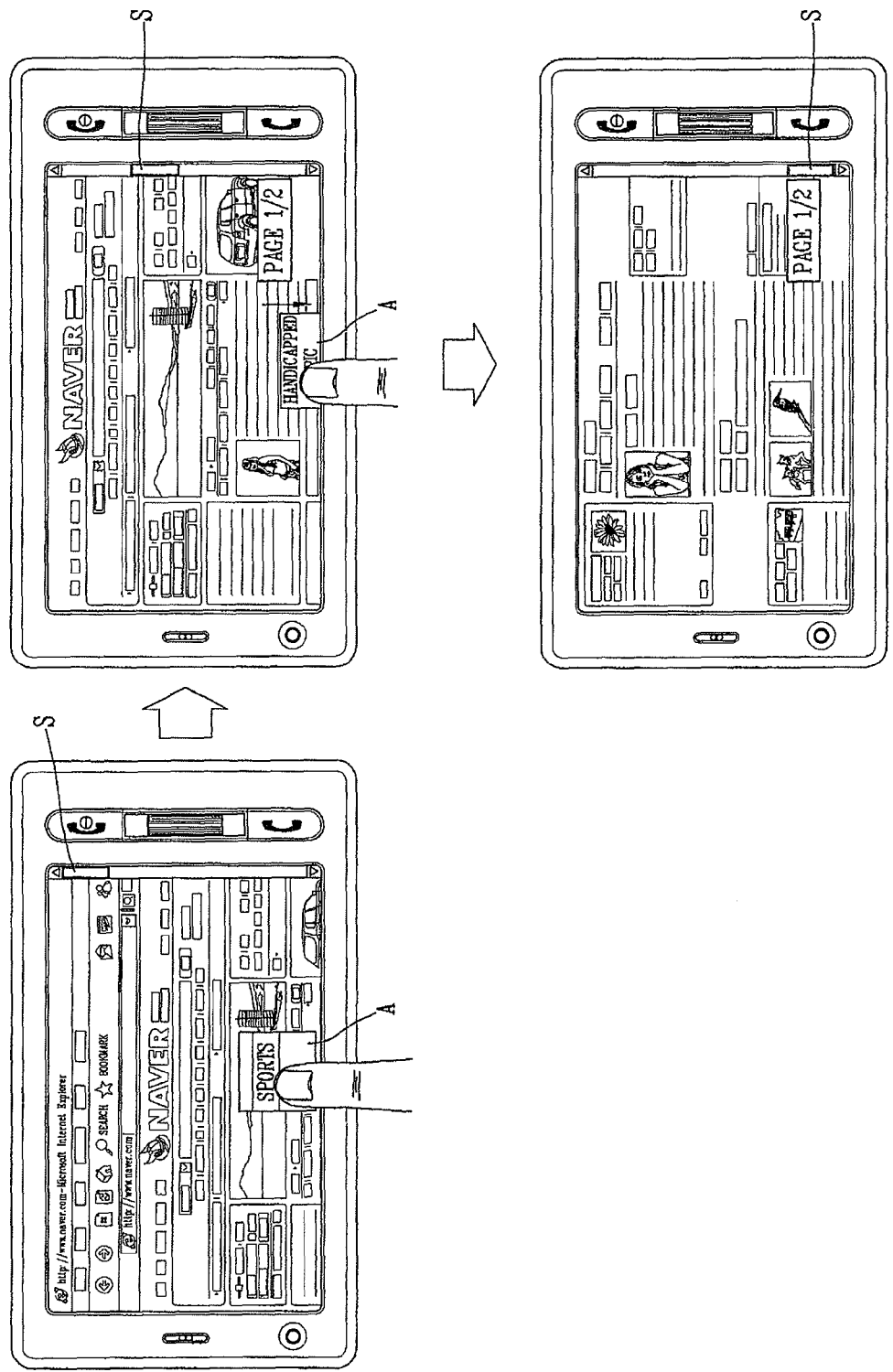

As shown in FIG. 9E, each different function may be performed according to the area of a portion of the magnified screen image (A) displayed at the boundary of the screen. The scroll speed may also be changed according to the area of one portion of the magnified screen (A) displayed at the boundary of the screen, or if the area of one portion of the magnified screen image (A) is smaller than a pre-set value, the one portion of the magnified screen image (A) may be moved to the outermost screen of the direction in which the one portion of the magnified screen image (A) is moved. Further, the outermost screen refers to a screen at which scrolling cannot be performed any further in the direction that the magnified screen image (A) is moved.

Figure 10:
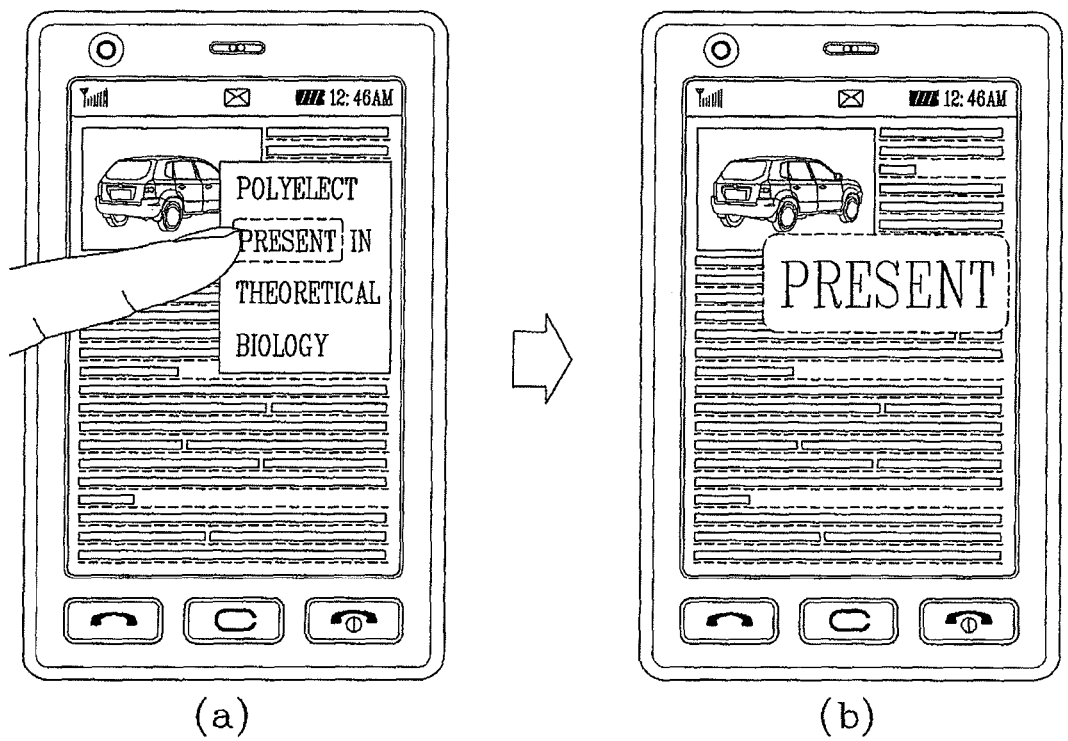
FIG. 10 is a front view of the mobile terminal having an additional magnification function according to one embodiment of the present invention.

As shown in FIG. 10, the additional function may be a function of magnifying a region or text where the magnified form is displayed. In more detail, when the user sets a portion of the region where the magnified form is displayed or a portion of the other remaining regions of the display unit 151 as a new region, a magnified form of the additionally set region may be displayed on a portion of the display unit 151. If the additionally set region is included in the region where the magnified form is displayed, the magnified form may be additionally magnified to be larger so as to be displayed on the display unit 151.

Figure 11:
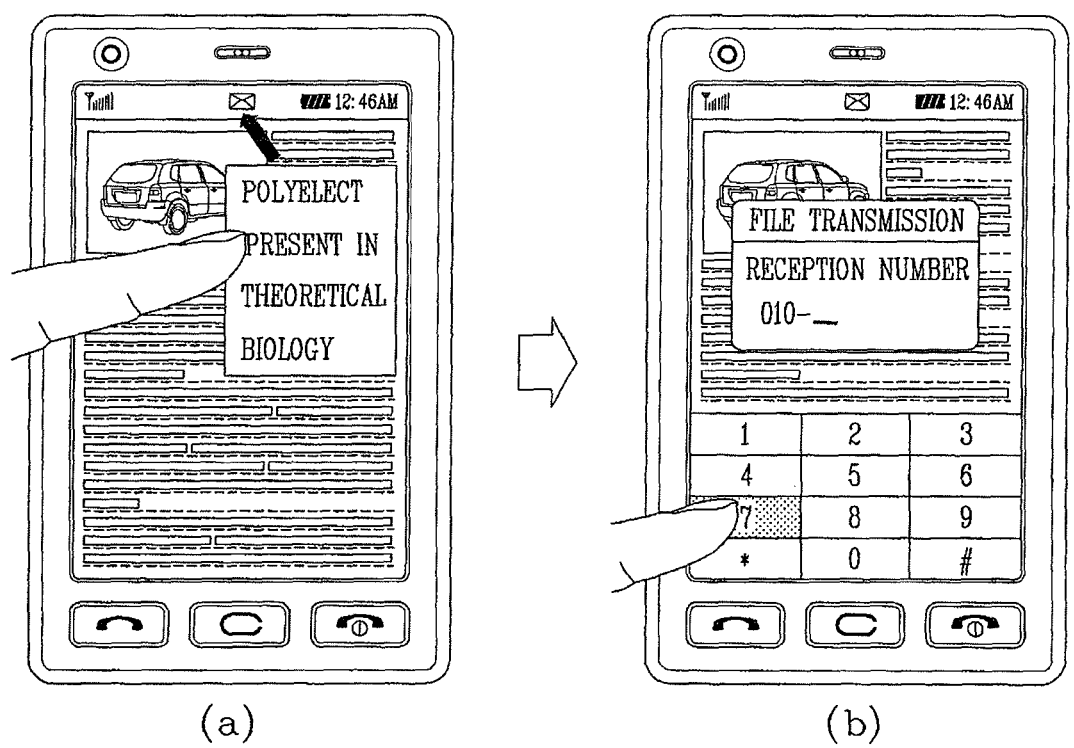
FIG. 11 is a front view of the mobile terminal having a transmission function according to one embodiment of the present invention.

As shown in FIG. 11, the additional function may be a function of transmitting information related to the magnified form. In more detail, the user may touch the magnified form and drag it so that the magnified form can be moved to an arbitrary position of the display unit 151 (see FIG. 11(a)). It may be set such that when the magnified form is moved to the arbitrary position, information related to the magnified form is transmitted (e.g., to another terminal). As shown in FIG. 11, the arbitrary position may be displayed on the display unit 151. In order to transmit the information related to the magnified form, a step for receiving the number of a terminal for receiving the information may be further provided as shown in FIG. 11(b).

Figure 12:
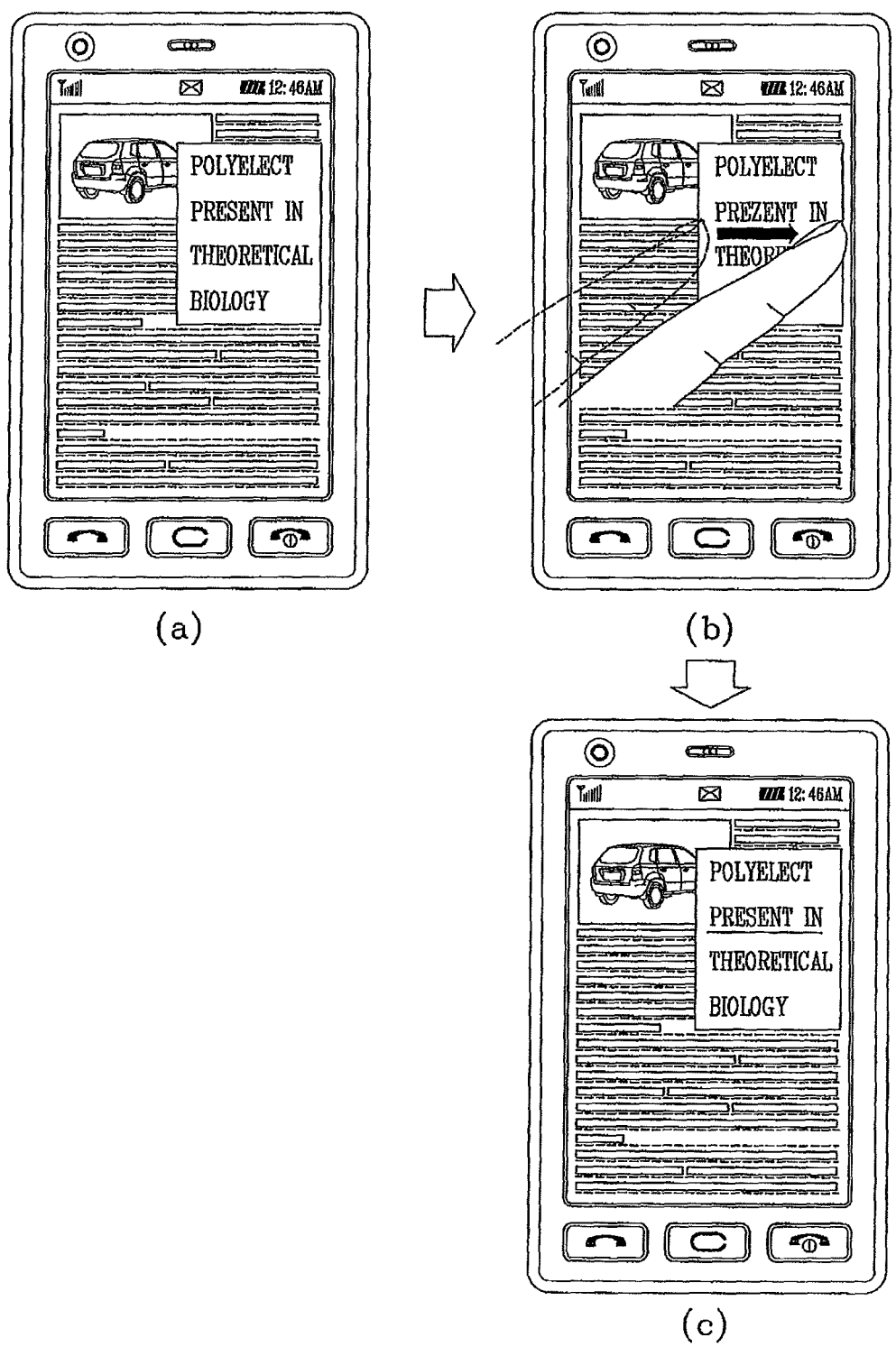
FIG. 12 is a front view of the mobile terminal having a correction function according to one embodiment of the present invention.

As shown in FIG. 12, the additional function may be a function of correcting the magnified form. In more detail, when a signal for correcting the magnified form is received by the user input unit 130, the controller 180 corrects the magnified form. The corrected form may be stored in the memory 160. Even after the magnification mode is terminated, the controller 180 may correct the previous image before it was magnified by reflecting the corrected form. If two or more additional function can be applicable to the magnified form, the controller 180 may select an additional function to be applied to the magnified form by using a signal for selecting the additional function inputted through the user input unit 130.

Next, FIGS. 13 and 14 are front views of the mobile terminal displaying a plurality of function execution icons according to another embodiment of the present invention. In more detail, when the user input unit 130 receives a signal for setting a region of the display unit 151 in a state that a plurality of function execution icons are displayed on the display unit 151, the controller 180 determines the set region and the number of the function execution icons within the region. If there is one function execution icon in the pre-set region, the controller 180 executes a function related to the function execution icon existing in the region. If there are a plurality of function execution icons in the set region, the controller 180 outputs a magnified form of information displayed on the set region to a portion of the display unit 151.

When the plurality of function execution icons of the mobile terminal 100 are displayed on the display unit 151, the size of the function execution icons are displayed to be small because of the limited size of the display unit 151. When the user wants to perform a function desired by the mobile terminal 100, the user may input a signal for selecting a function execution icon corresponding to the desired function. However, if the user does not know where the desired function execution icon is displayed, it would be difficult to know the function corresponding to the function execution icon displayed on the display unit 151 because the function execution icon is small in size.

As shown in FIG. 13, if there are a plurality of function execution icons exist in the set region, the magnified form of the information displayed on the set region is displayed at a portion of the display unit 151, whereby the user can easily recognize the function corresponding to the function execution icon through the magnified form. Because the magnified form is displayed only at the portion of the display unit 151, if there is no function execution icon desired by the user in the magnified form according to the result determined based on the magnified form, another region of the display unit 151 excluding the portion where the magnified form is displayed may be reset, and information displayed on the reset region may be magnified and displayed.

Through the above-described operation, the process for the user to select the function execution icons may be simplified, and the movement among the function execution menus can be also simplified. The position of the region where the magnified form is displayed may also be changed on the display unit 151 according to an input of an additional signal by the user. In addition, the scroll function may be applied to the display unit 151 where the function execution icons are displayed, according to an input of an additional signal by the user.

As shown in FIG. 14, when one function execution icon exists in a set region, a function related to the corresponding function execution icon may be executed. Even after the function related to the corresponding function execution icon is executed, the controller 180 may determine the number of function execution icons in the set region of the display unit 151 and execute pre-set functions according to the function execution icons.

The above-described method according to the embodiments of the present invention can be implemented as codes that can be read by a processor in a program-recorded medium. The medium that can be read by the processor includes a ROM, a RAM, a CD-ROM, a magnetic tape, a floppy disk, an optical data storage device, etc., and also includes implementation in the form of carrier waves (e.g., transmission via the Internet).

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
   a wireless communication unit configured to provide wireless communication;
   a memory configured to store information;
   a display; and
   a controller configured to:
   display at least part of the stored information on the display,
   scroll the displayed information based on one or more drag inputs, and
   receive new information via the wireless communication unit to display the received new information in response to a drag input applied to the display, if information to be displayed by the scrolling is not included in the stored information.

2. The mobile terminal of claim 1, wherein the drag input for receiving the new information is applied to the display along a first direction.

3. The mobile terminal of claim 2, wherein the first direction is a vertical direction or a downward direction.

4. The mobile terminal of claim 1, wherein the controller is further configured to:
   convert a current page, by a user input, to a new page of information in a state where the at least part of the stored information is displayed on the display.

5. The mobile terminal of claim 4, wherein the drag input for receiving the new information is applied to the display in a first direction, and
   wherein the user input includes a drag input in a second direction perpendicular to the first direction.

6. The mobile terminal of claim 5, wherein the first direction is a vertical direction and the second direction is a horizontal direction.

7. The mobile terminal of claim 1, wherein the displayed information is refreshed with the received new information.

8. The mobile terminal of claim 7, wherein the controller further configured to:
   display at least one of a text or an image to notify that the displayed information is being refreshed before displaying the received new information.

9. A mobile terminal comprising:
   a wireless communication unit configured to provide wireless communication;
   a memory configured to store information;
   a display; and
   a controller configured to:
   display at least part of the stored information on the display,
   scroll the displayed at least part of the stored information to display another part of the stored information based on one or more drag inputs, and
   receive new information via the wireless communication unit to display the received new information in response to a drag input applied to the display when the displayed another part of the stored information is not scrolled by the drag input.

10. The mobile terminal of claim 9, wherein the drag input for receiving the new information is applied to the display along a first direction.

11. The mobile terminal of claim 10, wherein the first direction is a vertical direction or a downward direction.

12. The mobile terminal of claim 9, wherein the controller is further configured to:
convert a current page, by a user input, to a new page of information in a state where the at least part of the stored information is displayed on the display.

13. The mobile terminal of claim 12, wherein the drag input for receiving the new information is applied to the display in a first direction, and
wherein the user input includes a drag input in a second direction perpendicular to the first direction.

14. The mobile terminal of claim 13, wherein the first direction is a vertical direction and the second direction is a horizontal direction.

15. The mobile terminal of claim 9, wherein information displayed on the display is refreshed with the received new information.

16. The mobile terminal of claim 15, wherein the controller further configured to:
display at least one of a text or an image to notify that the displayed information is being refreshed before displaying the received new information.

17. A mobile terminal comprising:
a wireless communication unit configured to provide wireless communication;
a memory configured to store information;
a display; and
a controller configured to:
display at least part of the stored information on the display, and execute one of first and second functions in response to a drag input applied to the displayed information,
wherein the first function is executed to scroll the displayed info nation in response to the drag input, and
wherein the second function is executed to receive new information via the wireless communication unit to display the received new information in response to the drag input when the displayed information is not scrolled.

18. The mobile terminal of claim 17, wherein the drag input is applied to the display along a vertical direction or a downward direction.

19. The mobile terminal of claim 17, wherein the controller is further configured to:
convert a current page, by a user input, to a new page of information in a state where the at least part of the stored information is displayed on the display.

20. The mobile terminal of claim 17, wherein the controller is further configured to:
display at least one of a text or an image to notify that the displayed information is being refreshed before displaying the received new information.

* * * * *